(12) United States Patent
Hatanaka

(10) Patent No.: US 11,015,947 B2
(45) Date of Patent: May 25, 2021

(54) MOBILE-OBJECT CONTROL SYSTEM

(71) Applicant: Dehenken Limited, Kyoto (JP)

(72) Inventor: Toyoshi Hatanaka, Kyoto (JP)

(73) Assignee: DEHENKEN LIMITED, Kyoto (JP)

(*) Notice: Subject to any disclaimer, the term of this patent is extended or adjusted under 35 U.S.C. 154(b) by 391 days.

(21) Appl. No.: 15/974,207

(22) Filed: May 8, 2018

(65) Prior Publication Data

US 2018/0341726 A1 Nov. 29, 2018

(30) Foreign Application Priority Data

May 26, 2017 (JP) ................................ 2017-104428

(51) Int. Cl.
*G01C 21/36* (2006.01)
*G05D 1/02* (2020.01)
(Continued)

(52) U.S. Cl.
CPC ..... *G01C 21/3638* (2013.01); *G01C 21/3667* (2013.01); *G05D 1/0289* (2013.01);
(Continued)

(58) Field of Classification Search
CPC ............ G01C 21/3638; G01C 21/3667; G01C 21/34; G05D 1/0289; G05D 1/0088; G08G 1/166
See application file for complete search history.

(56) References Cited

U.S. PATENT DOCUMENTS 4,763,270 A * 8/1988 Itoh .................... G01C 21/3632
340/988
6,801,850 B1 * 10/2004 Wolfson ............. G01C 21/3415
340/995.23
(Continued)

FOREIGN PATENT DOCUMENTS

JP  2003-185461 A  7/2003
JP  2005-242688 A  9/2005
(Continued)

OTHER PUBLICATIONS

Yang, Q., & Koutsopoulos, H. "A Microscopic Traffic Simulator for Evaluation for Dynamic Traffic Management Systems" Transportation Res., vol. 4, No. 3, pp. 113-129 (1996) (Year: 1996).*

(Continued)

*Primary Examiner* — Jay Hann
(74) *Attorney, Agent, or Firm* — McGinn I.P. Law Group, PLLC.

(57) ABSTRACT

[Problem] To simply simulate a situation where a plurality of mobile objects move in a space.
[Solution] A mobile-object control system is configured such that the system includes a path-point-data store unit to store path-point data containing coordinates of each of a plurality of path points on a route along which a mobile object moves; a sign-data store unit to store sign data containing coordinates of a sign object that influences moving velocity or moving direction of the mobile object and content of an instruction regarding the moving velocity or the moving direction that the sign object gives to the mobile object which catches this sign object within a prescribed range from the mobile object; a mobile-object-data store unit to store mobile-object data containing current coordinates, current moving velocity and current moving direction of each of a plurality of the mobile objects; and a simulation unit to iteratively calculate the coordinates, the moving velocity and the moving direction of each of the mobile objects moving in the space in every unit time with reference to the path-point data, the sign data and the mobile-object data, and to write the calculated new coordinates, the calculated new moving velocity and the calculated new moving direction of each of the mobile objects into the mobile-object-data store unit.

19 Claims, 20 Drawing Sheets

(51) Int. Cl.
*G06T 19/00* (2011.01)
*G08G 1/16* (2006.01)
*G05D 1/00* (2006.01)

(52) U.S. Cl.
CPC ......... *G06T 19/003* (2013.01); *G05D 1/0088* (2013.01); *G08G 1/166* (2013.01)

(56) References Cited

U.S. PATENT DOCUMENTS

| | | | |
|---|---|---|---|
| 8,346,426 B1 | 1/2013 | Szybalski et al. | |
| 9,068,852 B2 * | 6/2015 | Mason | G01C 21/3453 |
| 9,269,178 B2 * | 2/2016 | Piemonte | G01C 21/3635 |
| 10,654,476 B2 * | 5/2020 | Wray | B60W 30/09 |
| 2005/0192736 A1 * | 9/2005 | Sawada | G09B 23/00 |
| | | | 701/117 |
| 2008/0161986 A1 | 7/2008 | Breed | |
| 2016/0210775 A1 | 7/2016 | Alaniz et al. | |

FOREIGN PATENT DOCUMENTS

| | | |
|---|---|---|
| JP | 2017-049739 A | 3/2017 |
| JP | 2017-106978 A | 6/2017 |
| JP | 2017-138163 A | 8/2017 |
| JP | 2018-112845 A | 7/2018 |

OTHER PUBLICATIONS

Čivilis, A., et al. "Techniques for Efficient Road-Network-Based Tracking of Moving Objects" IEEE Transactions on Knowledge & Engineering, vol. 17, No. 5 (2005) (Year: 2005).*

Fangliang, L. & Zhiying, Y. "Navigational Information Update Mechanism Based on Moving Objects Databases" IEEE Fifth Int'l Conf. on Intelligent Computation Technology & Automation, pp. 537-540 (2012) (Year: 2012).*

Extended European Search Report dated Oct. 18, 2018 for European Patent Application No. 18172261.2-1003.

European Office Action, dated Apr. 17, 2020, in European Application No. 18172261.2-1001.

* cited by examiner

FIG. 4

| Cube ID | Latitude | Longitude | Significant figures | Height | Above ground level | Height of ground surface | Azimuth | Color |
|---|---|---|---|---|---|---|---|---|
| 0021-001 | 35.657151N | 139.157851E | 6 | 30 | 0 | 0 | 0 | White |
| 0021-002 | 35.657152N | 139.157851E | 6 | 30 | 0 | 0 | 0 | White |
| 0021-003 | 35.657153N | 139.157851E | 6 | 30 | 0 | 0 | 0 | White |
| 0021-004 | 35.657154N | 139.157851E | 6 | 30 | 0 | 0 | 0 | White |
| 0021-005 | 35.657151N | 139.157852E | 6 | 30 | 0 | 0 | 0 | White |
| 0021-006 | 35.657152N | 139.157852E | 6 | 30 | 0 | 0 | 0 | White |
| 0021-007 | 35.657153N | 139.157852E | 6 | 30 | 0 | 0 | 0 | White |
| 0021-008 | 35.657154N | 139.157852E | 6 | 30 | 0 | 0 | 0 | White |
| ... | ... | ... | ... | ... | ... | ... | ... | ... |
| 0208-001 | 35.357589N | 139.175124E | 6 | 15 | 13 | 0 | 30 | Black |
| 0208-002 | 35.357589N | 139.175125E | 6 | 15 | 13 | 0 | 30 | Black |
| 0208-003 | 35.357589N | 139.175126E | 6 | 15 | 13 | 0 | 30 | Black |
| 0208-004 | 35.357589N | 139.175127E | 6 | 15 | 13 | 0 | 30 | Black |
| 0208-005 | 35.357589N | 139.175128E | 6 | 15 | 13 | 0 | 30 | Black |
| ... | ... | ... | ... | ... | ... | ... | ... | ... |

FIG. 7

| ID | Route ID | Latitude | Longitude | Significant figures | Height | Command |
|---|---|---|---|---|---|---|
| 0051 | Meishin Expressway outbound lane | 34.953364N | 135.744466E | 6 | 12 | None |
| 0052 | Meishin Expressway outbound lane | 34.953265N | 135.744200E | 6 | 12.4 | None |
| 0053 | Meishin Expressway outbound lane | 34.953142N | 135.743890E | 6 | 12.6 | None |
| ... | ... | ... | ... | ... | ... | ... |
| 0253 | Route 105 inbound lane | 34.953459N | 135.743898E | 6 | 12.6 | Desired velocity 40 km/h |
| ... | ... | ... | ... | ... | ... | ... |

FIG. 10

| Sign ID | Type | Latitude | Longitude | Significant Figures | X-width | Y-width | Height | Above ground level | Azimuth | Command | Detection range |
|---|---|---|---|---|---|---|---|---|---|---|---|
| 0007-001 | Velocity sign | 35.657151N | 139.157851E | 6 | 2 | 2 | 5 | 0 | 0 | Desired velocity 50 km/h | 70 |
| ... | ... | ... | ... | ... | ... | ... | ... | ... | ... | ... | ... |
| 0021-012 | Intersection sign | 37.151224N | 146.515124E | 6 | 15 | 15 | 7 | 0 | 75 | S1, 20, 3, S2, 20, 3 | 100 |
| ... | ... | ... | ... | ... | ... | ... | ... | ... | ... | ... | ... |

FIG. 15

| Mobile object ID | Latitude | Longitude | Significant figures/Above ground level | Desired velocity | Desired azimuth | Desired elevation/depression | Current Velocity | Current azimuth | Current elevation/depression |
|---|---|---|---|---|---|---|---|---|---|
| 7715-112 | 35.657151N | 139.157851E | 6 | 70 | 20 | 0 | 60 | 15 | 0 |
| ... | ... | ... | ... | ... | ... | ... | ... | ... | ... |
| 7798-020 | 37.151224N | 145.515124E | 6 | 50 | 125 | 0 | 50 | 135 | 0 |
| ... | ... | ... | ... | ... | ... | ... | ... | ... | ... |

FIG. 20

| Cube ID | Element | Latitude | Longitude | Significant figures | Height | Drawing | Color |
|---|---|---|---|---|---|---|---|
| 0021-001 | Vertex P0 | 35.657151N | 139.157851E | 6 | 0 | Need | White |
| 0021-001 | Vertex P1 | 35.657151N | 139.157852E | 6 | 0 | Need | White |
| 0021-001 | Vertex P2 | 35.657152N | 139.157852E | 6 | 0 | Need | White |
| 0021-001 | Vertex P3 | 35.657152N | 139.157851E | 6 | 0 | No need | White |
| 0021-001 | Vertex P4 | 35.657151N | 139.157851E | 6 | 30 | Need | White |
| 0021-001 | Vertex P5 | 35.657151N | 139.157852E | 6 | 30 | Need | White |
| 0021-001 | Vertex P6 | 35.657152N | 139.157852E | 6 | 30 | Need | White |
| 0021-001 | Vertex P7 | 35.657152N | 139.157851E | 6 | 30 | Need | White |
| 0021-001 | Edge L0 | — | — | — | — | Need | White |
| 0021-001 | Edge L1 | — | — | — | — | Need | White |
| 0021-001 | Edge L2 | — | — | — | — | No need | White |
| 0021-001 | Edge L3 | — | — | — | — | No need | White |
| 0021-001 | Edge L4 | — | — | — | — | Need | White |
| 0021-001 | Edge L5 | — | — | — | — | Need | White |
| 0021-001 | Edge L6 | — | — | — | — | Need | White |
| 0021-001 | Edge L7 | — | — | — | — | No need | White |
| ... | ... | ... | ... | ... | ... | ... | ... |

MOBILE-OBJECT CONTROL SYSTEM

TECHNICAL FIELD

The present invention relates to a mobile-object control system to simulate a situation where a plurality of mobile objects move in a space.

BACKGROUND ART

Trying to minutely digitalize locations and shapes of buildings, structures and landform existing in a real space, mobile objects moving in the space (such as vehicles, pedestrians, robots, flying objects including planes, and ships) or passages on which mobile objects can move (such as roads and bridges) and store those data extremely multiplies data volume and complicates the process for finding distance and direction from a mobile object utilizing those data, and consequently it may cause increasing calculation amount and delay in processing.

The inventor of the present invention has already filed patent applications with respect to a method of expressing information on buildings, structures, landform, mobile objects or passages by small volume data that is easy to use so as to solve the above problem (See following Patent Documents 1 to 4). In detail, it is such that a space is divided into grids each having dimensions consisting of an uniform width in latitude and an uniform width in longitude, and coordinates of one or more grids overlapping with objects existing in the space are stored in a database. Further, when information on height of the objects with which the grids overlap is added to information on the coordinates of each of the grids, the objects existing in the space can be each expressed as a rectangular parallelepiped cube (cuboid) or a set of cubes.

Also, in order to realize autonomous control, automatic driving or semiautomatic driving of a mobile object, it is desired to make a database collecting locations of movable routes for the mobile object beforehand and perform a movement of the mobile object along an appropriate route.

The inventor of the present invention has already filed a patent application with respect to a method of expressing information on moving routes along which a mobile object may move by small volume data so as to contribute to detecting routes around the mobile object and controlling the mobile object (See following Patent Document 3). In detail, each of the routes along which a mobile object may move is segmented into a plurality of sections, latitude and longitude of a predetermined position in a width direction, which crosses a direction that each of the routes extends along, are determined in respect to every section, then the latitude and the longitude of the predetermined position in every section are stored and accumulated as path-point data. On that basis, a steering device mounted on the mobile object is manipulated such that the movement direction of the mobile object revealed from a time series of latitude and longitude of the current positions of the mobile object becomes parallel to the extension direction of the moving route revealed from the path-point data on several sections that the mobile object will enter hereafter, or the steering amount or direction required for that is output in such a way to appeal to visual or auditory perception of a person on the mobile object.

RELATED ART DOCUMENTS

Patent Documents

Patent document 1: Japanese Unexamined Patent Application Publication No. 2017-049739.

Patent document 2: Japanese Unexamined Patent Application No. 2015-238754.

Patent document 3: Japanese Unexamined Patent Application No. 2016-018333.

Patent document 4: Japanese Unexamined Patent Application No. 2017-002150.

SUMMARY OF THE INVENTION

Problems to be Solved by the Invention

It is an object of the present invention to simply simulate a situation where a plurality of mobile objects move in a space.

Means of Solving the Problems

According to the present invention, a mobile-object control system is such that the system includes a path-point-data store unit to store path-point data containing coordinates of each of a plurality of path points on a route along which a mobile object moves in a space; a sign-data store unit to store sign data containing coordinates of a sign object that influences moving velocity or moving direction of the mobile object moving in the space and content of an instruction regarding the moving velocity or the moving direction that the sign object gives to the mobile object which catches this sign object within a prescribed range from the mobile object; a mobile-object-data store unit to store mobile-object data containing current coordinates, current moving velocity and current moving direction of each of a plurality of the mobile objects moving in the space; and a simulation unit to iteratively calculate the coordinates, the moving velocity and the moving direction of each of the mobile objects moving in the space in every unit time with reference to the path-point data stored by the path-point-data store unit, the sign data stored by the sign-data store unit and the mobile-object data stored by the mobile-object-data store unit, and to write the calculated new coordinates, the calculated new moving velocity and the calculated new moving direction of each of the mobile objects into the mobile-object-data store unit.

The mobile-object control system may include an output unit to generate an image showing the current position of at least one of the mobile objects in the space with reference to the mobile-object data stored by the mobile-object-data store unit. The output unit may display the generated image in a screen of a monitor, store data of the generated image into a necessary memory area of a main memory or an auxiliary memory device, or send it to an external computer and so on that is connected and can be communicated through a telecommunications line.

In addition, the mobile-object control system may include a cube-data store unit to store cube data containing coordinates, flat dimensions and height of each of a plurality of cubes that symbolize an object existing in the space other than the mobile object. On top of that, the output unit may generate an image showing the cubes that symbolize the object existing in the space as well as the current position of at least one of the mobile objects in the same space, and display the image in a screen of a monitor.

If the mobile-object control system is configured such that the sign-data store unit stores the sign data containing the content of the current instruction changed over time regarding the moving velocity or the moving direction that the sign object gives to the mobile object which catches the sign object within the prescribed range from the mobile object, and besides the simulation unit iteratively calculates the coordinates, the moving velocity and the moving direction of each of the mobile objects moving in the space in every unit time based on the content of the current instruction that the sign object gives to the mobile object stored by the sign-data store unit, and writes the calculated new coordinates, the calculated new moving velocity and the calculated new moving direction of each of the mobile objects into the mobile-object-data store unit, it is possible to simulate control of the movement of each of the mobile objects with the sine object that is set in the space and has states changing over every minute like a signal.

Also, if the mobile-object control system is configured such that the simulation unit sets, based on the current coordinates and the current moving direction of each of the mobile objects stored by the mobile-object-data store unit, the moving velocity of a certain mobile object lower when the certain mobile object approaches another mobile object existing ahead in the direction of movement of the certain mobile object within a prescribed range of distance than that when it does not, and writes the new coordinates, the new moving velocity and the new moving direction of the certain mobile object into the mobile-object-data store unit, it is possible to simulate a situation where the movement of the mobile objects is restricted due to traffic congestion or other reasons.

A program used to constitute the mobile-object control system according to the present invention makes a computer function as: a path-point-data store unit to store path-point data containing coordinates of each of a plurality of path points on a route along which a mobile object moves in a space; a sign-data store unit to store sign data containing coordinates of a sign object that influences moving velocity or moving direction of the mobile object moving in the space and content of an instruction regarding the moving velocity or the moving direction that the sign object gives to the mobile object which catches this sign object within a prescribed range from the mobile object; a mobile-object-data store unit to store mobile-object data containing current coordinates, current moving velocity and current moving direction of each of a plurality of the mobile objects moving in the space; and a simulation unit to iteratively calculate the coordinates, the moving velocity and the moving direction of each of the mobile objects moving in the space in every unit time with reference to the path-point data stored by the path-point-data store unit, the sign data stored by the sign-data store unit and the mobile-object data stored by the mobile-object-data store unit, and to write the calculated new coordinates, the calculated new moving velocity and the calculated new moving direction of each of the mobile objects into the mobile-object-data store unit.

Effects of the Invention

The present invention enables simply simulating a situation where a plurality of mobile objects move in a space.

BRIEF DESCRIPTION OF THE DRAWINGS

FIG. 4 is a diagram showing cube data stored by a cube-data store unit according to the embodiment.

FIG. 7 is a diagram showing path-point data stored by a path-point-data store unit according to the embodiment.

FIG. 10 is a diagram showing sign data stored by a sign-data store unit according to the embodiment.

FIG. 15 is a diagram showing mobile-object data stored by a mobile-object-data store unit according to the embodiment.

FIG. 20 is a diagram showing an example of information output by an output unit according to the embodiment.

MODE FOR CARRYING OUT THE INVENTION

Figure 1:
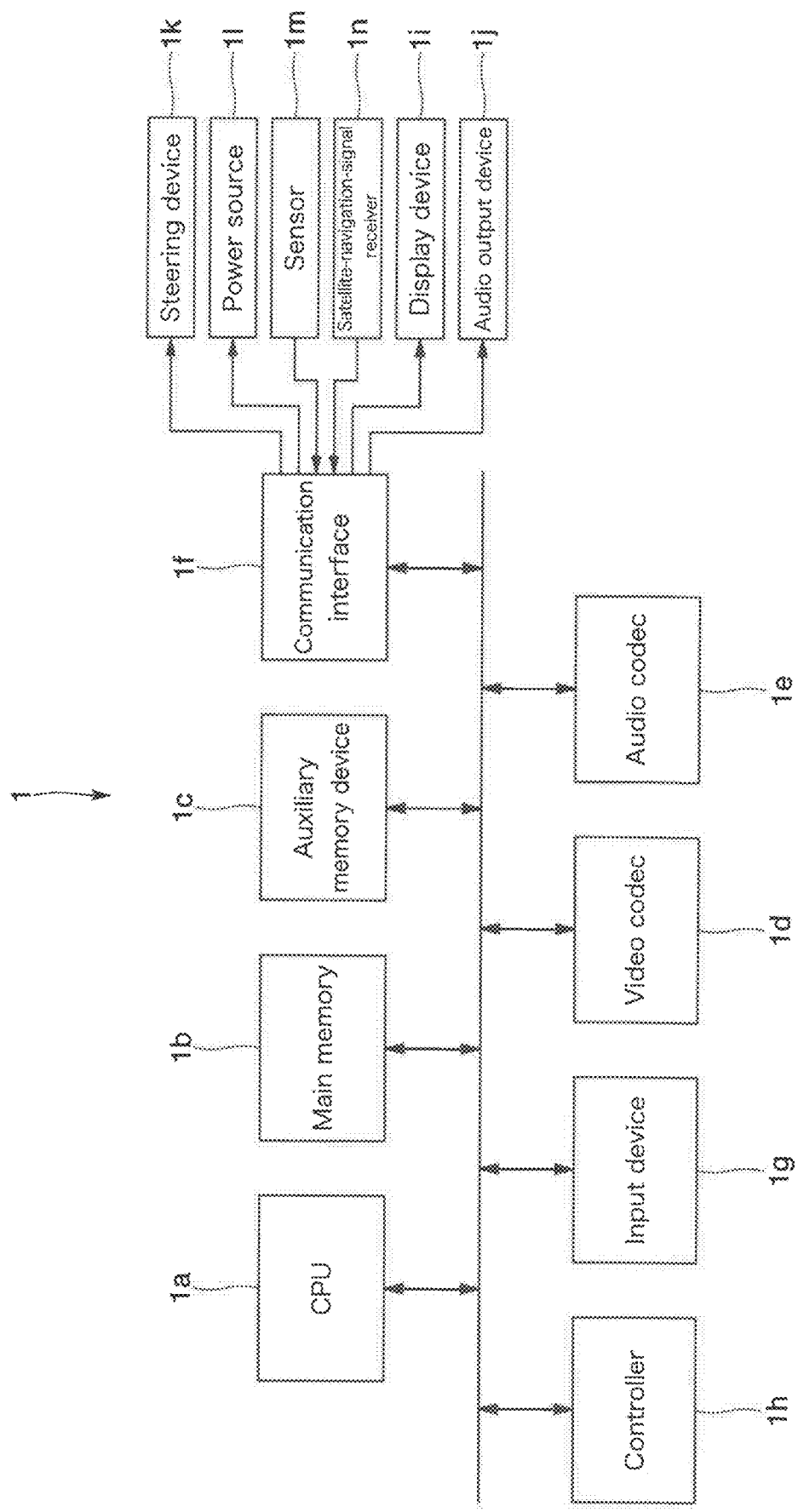
FIG. 1 is a diagram showing a configuration of hardware resources in a mobile-object control system according to an embodiment of the present invention.

Described below is an embodiment of the present invention with reference to drawings. A mobile-object control system according to this embodiment is mainly constituted by a computer 1. The computer 1 may be a general-purpose personal computer, a workstation, a portable notebook computer, a tablet computer, a mobile phone or other portable information appliances. As shown in FIG. 1, the computer 1 consists of hardware resources such as a central processing unit (CPU) 1a, a main memory 1b, an auxiliary memory device 1c, a video codec 1d, an audio codec 1e, a communication interface 1f, and an input device 1g, each of these components is controlled by a controller (i.e. a system controller, an I/O controller, and so on) 1h to operate in coordination with the other components.

The auxiliary memory device 1c is a flash memory, a hard drive, an optical disk drive, or others. The video codec 1d is composed of a graphics processing unit (GPU) which creates images to be displayed based on instructions from the CPU 1a and outputs video signals corresponding to the images to a display device 1i, a video memory which temporarily stores data of the images or screen, and so on. The audio codec 1e decodes encoded audio data and outputs sound through an audio output device 1j. Each the video codec 1d and the audio codec 1e may be implemented as not a hardware but a software. The communication interface 1f is a device for the computer 1 to exchange information with external devices or computers. A wireline connection interface and a wireless transceiver to perform information communication through telecommunications lines such as the internet, a wide area network (WAN), a metropolitan area network (MAN), a local area network (LAN) a cellular network, and the worldwide interoperability for microwave Access (WiMAX) network are included in the communication interface 1f. The input device 1g is a touchscreen (it may be layered on the display device 1i), push buttons, a mouse, a keyboard and so on that a user can operate with fingers, or an audio input device through which the user inputs instructions with the user's natural voice.

This mobile-object control system may be installed and utilized in a mobile object M such as a vehicle, a robot, a flying object (in particular, a drone that is an unmanned aerial vehicle remotely piloted or autonomously controlled. Many drones are multicopters (or multi-rotor helicopters, multirotors) with more than two rotors) and others. In this case, there is a possibility that the computer 1 constituting the mobile-object control system will control operation of the mobile object M. For example, the mobile object M such as a vehicle and a robot, which can travel, has a camera censor (it may be a panoramic camera), a radar sensor or a rangefinder (a ranging sensor, e.g., a laser radar, a ultrasonic radar, an infrared radar), a passive infrared sensor (or a motion detector) and so on, a satellite-navigation-signal receiver 1n to receive satellite navigation signals of a satellite navigation system (or a satellite positioning system) such as the global positioning system and the quasi-zenith satellite system (QZSS), as well as a known steering device 1k to change the direction of wheels for traveling and a known engine or motor to be a power source 1l rotating wheels. The camera censor, the radar sensor, the rangefinder, the passive infrared sensor and so on are sensors 1m to detect carriageway markings laid on road surfaces of moving routes RO along which the mobile object M moves or objects around the mobile object M. Moreover, the computer 1 detects objects existing around and determine latitude and longitude of the current position of the mobile object M itself with using the sensors 1m and the satellite-navigation-signal receiver 1n so as to move the mobile object M along the moving routes RO appropriately through controlling the steering device 1k and the power source 1l.

Figure 2:
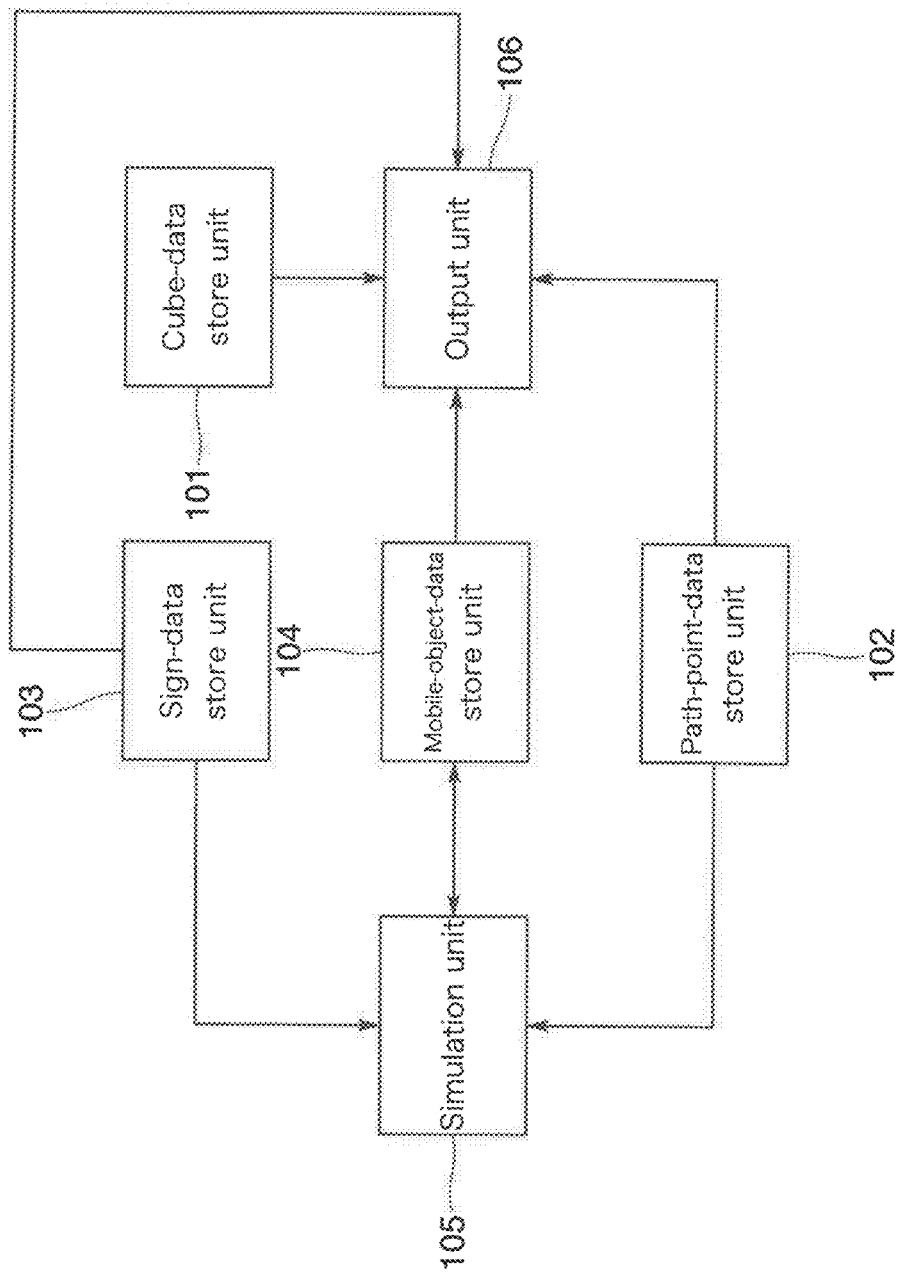
FIG. 2 is a functional block diagram of the mobile-object control system according to the embodiment.

In the computer 1, programs to be run by the CPU 1a is stored in the auxiliary memory device 1c, the main memory 1b reads the programs, then the CPU 1a interprets the programs when running those. The computer 1 operates the above hardware resources in accordance with the programs, and functions as a cube-data store unit 101, a path-point-data store unit 102, a mobile-object-data store unit 104, a sign-data store unit 103, a simulation unit 105 and an output unit 106 shown in FIG. 2.

The cube-data store unit 101 stores cube data containing latitude, longitude, flat dimensions and height of each of a plurality of cubes C that symbolize objects (other than the mobile objects M) existing in a real space into a necessary memory area of the main memory 1b or the auxiliary memory device 1c, the latitude and the longitude indicating the position where the cube C exists.

Figure 3:
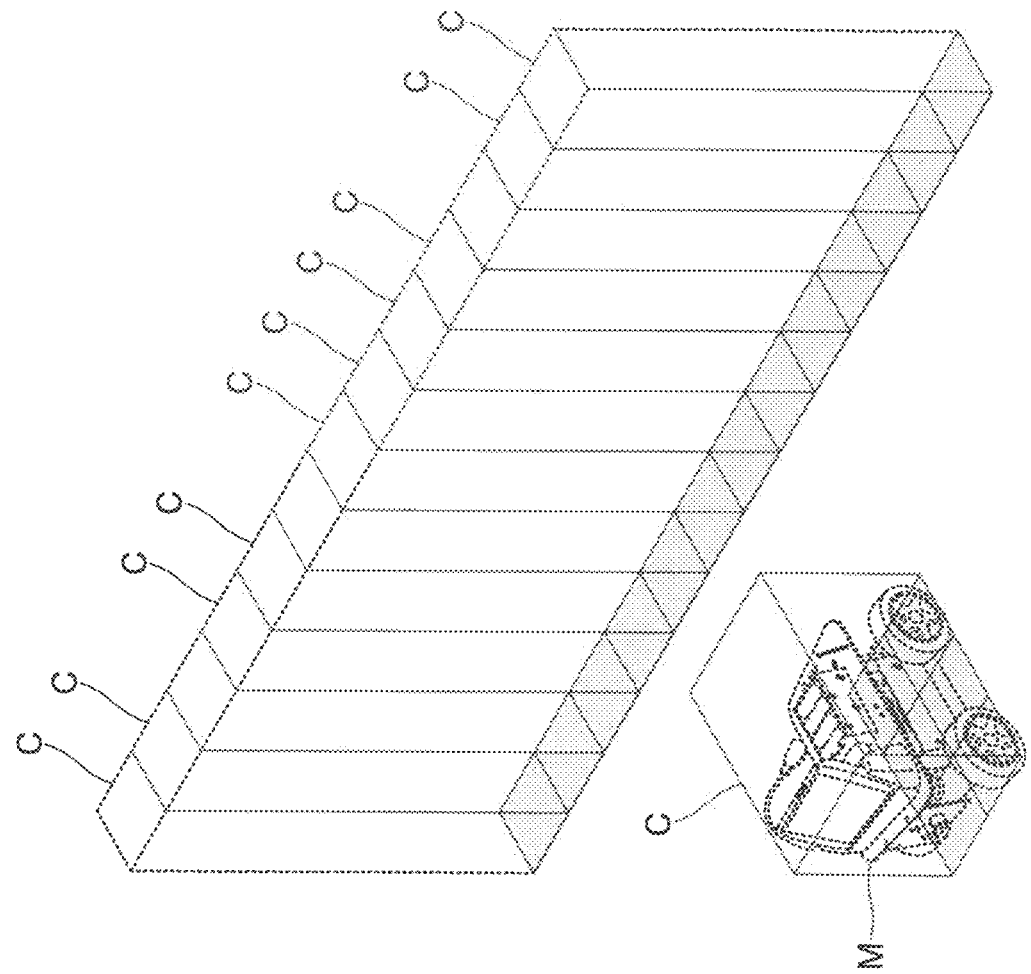
FIG. 3 is a diagram showing an example of an image displaying cubes that symbolize objects existing in a space output by the mobile-object control system according to the embodiment.
Figure 3:
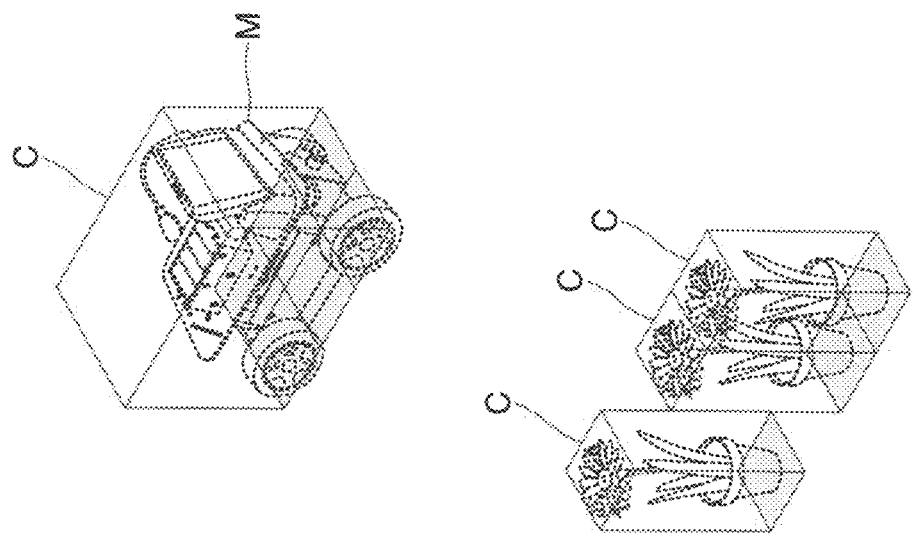

As exemplified in FIG. 3, in this embodiment, it is postulated that each of various objects (including the mobile objects M) existing in a space be one cube C or a set of cubes C. The cubes C abstractly represent locations, shapes and dimensions of the objects. As a prerequisite, in this embodiment, the real space where the mobile objects are utilized is partitioned by a lattice with regular latitudinal intervals and regular longitudinal intervals so as to be divided into virtual grids each having dimensions consisting of an uniform width in latitude and an uniform width in longitude. One grid is a quadrilateral (or a tetragon, it is approximately a rectangle but not a rigorous rectangle) having a predetermined dimension in the latitudinal direction and a predetermined dimension in the longitudinal direction. In order to indicate one grid, at least one position coordinate is given to one grid. The position coordinate contains latitude and longitude of a point in an objective grid, for example, a corner (a northeast corner, a southeast corner, a southwest corner or a northwestern corner) or a center of the grid. The latitude and the longitude are values with necessary digits each. For instance, when significant figures of the latitude and the longitude is set to six digits after the decimal point, in other words, a position coordinate [latitude, longitude] of (a northeast corner of) a certain grid is given like [lat. 35.675126° N., long. 139.752472° E.] as data to indicate this grid, a position coordinate of (a northeast corner of) another grid adjacent to the north of this grid is [lat. 35.675127° N., long. 139.752472° E.] that contains north latitude increasing by 0.000001°, a position coordinate of (a northeast corner of) another grid adjacent to the west of this grid is [lat. 35.675126° N., long. 139.752471° E.] that contains east longitude decreasing by 0.000001°.

When the significant figures of the latitude and the longitude of the position coordinate are set to six digits after the decimal point, one grid becomes a quadrilateral having dimensions corresponding to 0.000001° in the latitudinal direction and the longitudinal direction. All grids do not have uniform flat dimensions because the concrete size thereof is influenced by latitude and longitude. That is, as approaching the North Pole or the South Pole, the distance of a unit degree of longitude (in the east and west direction) becomes shorter drastically while the distance of a unit degree of latitude (in the south and north direction) becomes longer slightly. When the significant figures of the latitude and the longitude are six digits after the decimal point, the width in the latitudinal direction of one grid is about 0.11 m from south to north and the width in the longitudinal direction of one grid is about 0.09 m from east to west in Japan. However, the Japan Islands are extended south and north, it is not always appropriate to completely disregard variation in size depending on latitude of a location.

When the significant figures of the latitude and the longitude of the position coordinate are set to five digits after the decimal point, the width in the latitudinal direction of one grid is about 1.1 m and the width in the longitudinal direction of one grid is about 0.9 m. When the significant figures are set to four digits after the decimal point, the width in the latitudinal direction of one grid is about 11 m and the width in the longitudinal direction of one grid is about 9 m. In short, the significant figures of the latitude and the longitude regulates the flat dimensions, namely, the width in the latitudinal direction and the width in the longitudinal direction of the grid. It is possible to arbitrarily set the significant figures of the latitude and the longitude according to uses or dimensions of the objects. In order to fit as few grids as possible into the object having large area like a big building and so on, setting the significant figures of the latitude and the longitude to a small number is effective.

On top of that, in this embodiment, as shown in FIG. 3, the cube C formed into a rectangular parallelepiped standing erect on the grid is imagined, each of the various objects existing in the real space is symbolized by one or a plurality of the cubes C. As shown in FIG. 4, with respect to each of the cubes C, the cube-data store unit 101 stores the cube data containing information on the height of the cube C above the grid as well as the position coordinate [latitude, longitude] of the grid that the cube C occupies and the significant figures thereof in association with an identifier used to identify this cube C. The height of the cube C means a height position (it may be altitude or height above sea level) of an upper surface of the object or a part of the object that exists over the grid in the real space and is symbolized by the cube C.

In addition, as shown in FIG. 4, with respect to each of the cubes C, information on above ground level of the cube C or height of a ground surface in the grid over which the cube C exists may be added. The above ground level of the cube C means a height position (it may be altitude or height above sea level) of a lower surface of the object or a part of the object that exists over the grid in the real space. The height of the ground surface in the grid means a height position (it may be altitude or height above sea level) of the grid itself. In order to represent the objects above the surface of the earth or a floor surface on which the mobile objects M exist such as bridges, girders and gates, the above ground level of the cube C is set to a positive value larger than the height of the ground surface in the grid. The above ground level is equal to the height of the ground surface for many objects grounded on the surface of the earth or the floor surface. In order to represent the objects under the surface of the earth or the floor surface, for example, grooves, holes, tunnels, rivers, lakes and seas, the height and the above ground level of the cube C are each set to a value less than the height of the ground surface in the grid. The value may be negative.

The objects that one or a plurality of the cubes C symbolize are, for example, obstructions existing in the space where the mobile object M move such as buildings, structures, median strips, streetlights and trees, roads and bridges on which the mobile objects M can move, and landform. Each of these objects can be represented by one or a plurality of the cubes C approximately equal to a region that each of the objects occupies in the space. Therefore it is possible to digitalize each of the objects with a set of values including the position coordinate and the height (and furthermore, the above ground level, color, and so on) of the cubes C symbolizing the target object. When the significant figures of the latitude and the longitude of the position coordinate of the cubes C are set to six digits after the decimal point, a passage with a total length of 100 m and a width of 3 m can be interpreted as aggregate of the about thirty thousand cubes C (depending on the direction of the passage), and digitalized into data containing the same number of sets of the position coordinate and the height. Also, when the significant figures of the latitude and the longitude of the position coordinate of the cubes C are set to five digits after the decimal point, a building with an area of 400 m² can be interpreted as aggregate of the about four hundred cubes C, and digitalized into data containing the same number of sets of the position coordinate and the height.

Of course, the cube data stored by the cube-data store unit 101 may contain values to directly specify flat dimensions of each of the cubes C symbolizing the objects, namely, the width in a horizontal x direction and the width in a horizontal y direction orthogonal to the x direction of the cube C. In this case, the cube C with the flat dimensions specified directly has the flat dimensions independent of the significant figures of the latitude and the longitude of the position coordinate of the cube C (or the grid where the cube C exists). In other words, it is possible that the flat dimensions of the cube C may be different from the flat dimensions of the grid, one cube C may expand out of one grid and occupy a plurality of the grids, otherwise one cube C may reduce from one grid and not occupy the whole grid. As described above, the cube C that is not given the values of the flat dimensions has the width in the x direction (longitudinal direction) and the width in the y direction (latitudinal direction) depending on the significant figures of the latitude and the longitude of the position coordinate of the grid where the cube C exists. That is, the significant figures of the latitude and the longitude of the position coordinate of the cube C indirectly specify the flat dimensions of the cube C occupying the grid.

Figure 5:
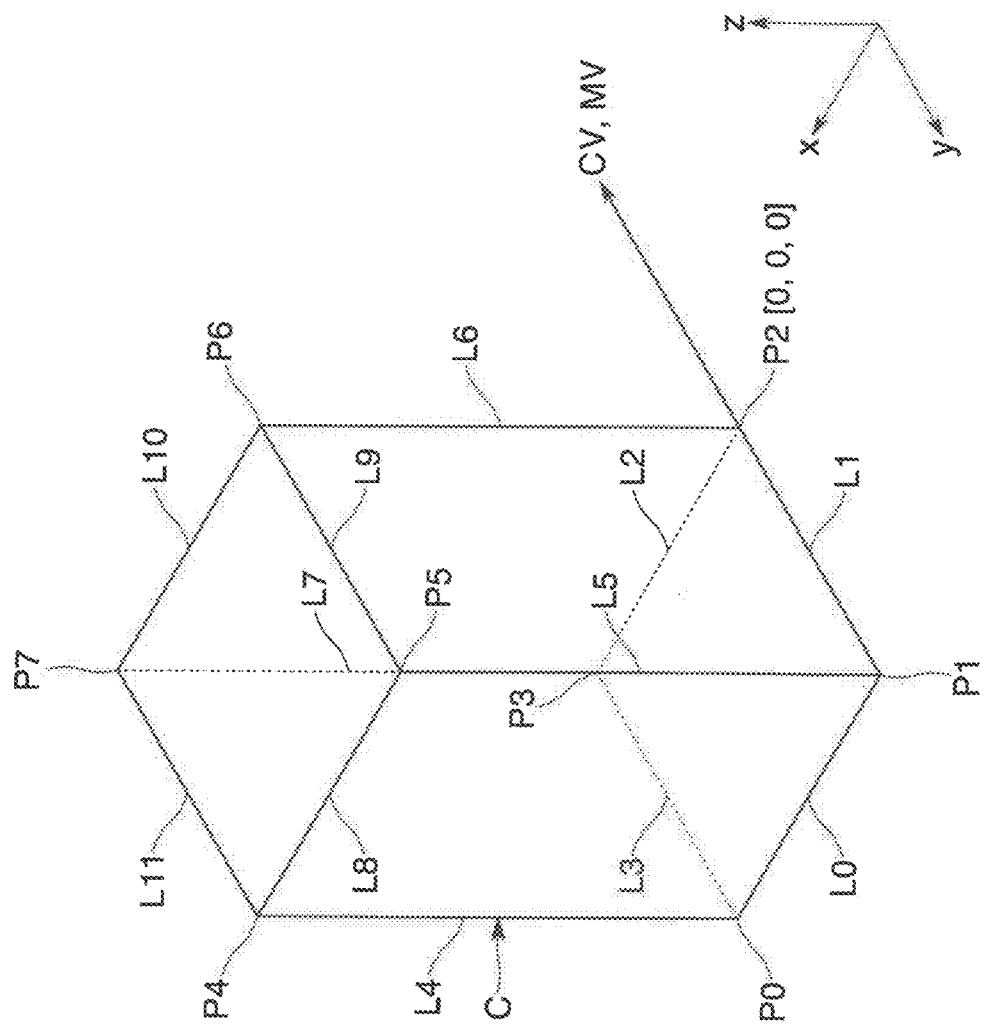
FIG. 5 is a diagram showing vertices and edges of a cube for symbolizing the objects, and a direction to which the cube faces according to the embodiment.

As shown in FIG. 4, with respect to each of the cubes C, information on an azimuth angle defining the direction of the cube C may be added. As shown in FIG. 5, the azimuth CV of the cube C indicates which direction the azimuth vector CV points in the space, the azimuth vector CV extending from a specific vertex P2 [x, y]=[0, 0] of the cube C along the y axis of the cube C such that the value of y is negative. In the left-handed system where an azimuth angle of 0° (and 360°) is due north, an azimuth angle of 90° is due east, an azimuth angle of 180° is due south, and an azimuth angle of 270° is due west. On that basis, when the azimuth angle of the cube is 90°, the cube C faces so that the azimuth vector CV extends toward the due east. The cube C that is not given the azimuth angle faces so that the azimuth vector CV extends toward the due north. Hence, it is equivalent to setting the azimuth angle of the cube C to 0° that the azimuth angle of the cube C is not specified.

Instead of the left-handed system, the right-handed system may be selected for the azimuth angle. In the right-handed system where an azimuth angle of 0° (and 360°) is due east, an azimuth angle of 90° is due north, an azimuth angle of 180° is due west, and an azimuth angle of 270° is due south.

As shown in FIG. 4, with respect to each of the cubes C, information on color or the like of the object or a part of the object that the cube C symbolizes may be further added.

The path-point-data store unit 102 stores path-point data containing coordinates of each of a plurality of path points on routes RO along which the mobile objects M move in the space into a necessary memory area of the main memory 1b or the auxiliary memory device 1c.

Figure 6:
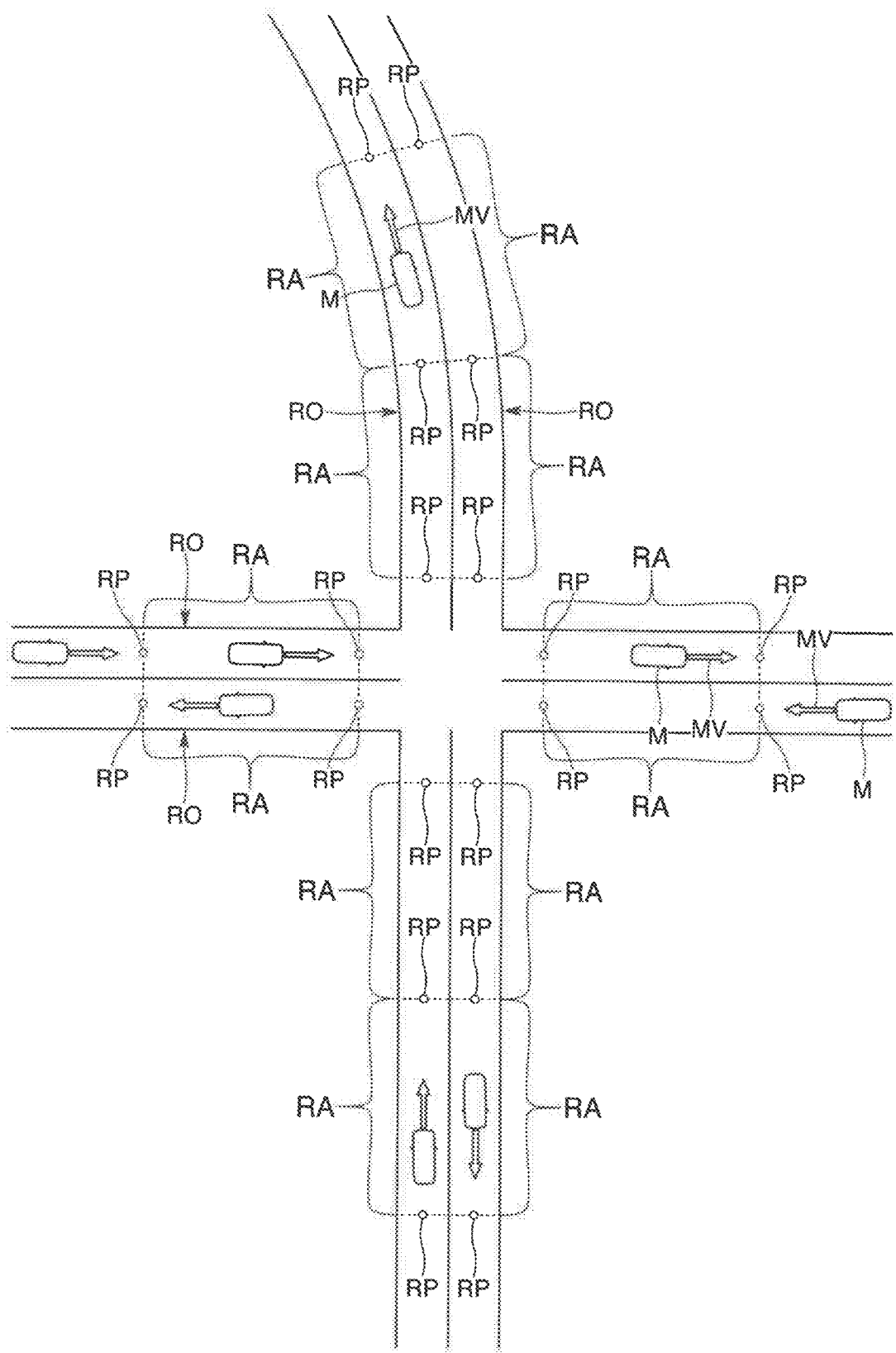
FIG. 6 is a diagram showing mobile objects, moving routes, sections of those and path points according to the embodiment.

As shown in FIG. 6, the routes RO along with the mobile objects M can move are segmented into a plurality of sections RA, the path points are points RP positioned on the moving routes RO and provided for each of the sections RA, or points positioned on virtual lines extending in parallel with the moving routes RO and provided for each of the sections RA. The mobile objects M pass through the path points RP arranged along the moving routes RO or in the neighborhoods thereof seriatim while the mobile objects M move according to moving routes RO.

In this embodiment, each of the moving routes RO for the mobile objects M is segmented at regular intervals corresponding to migration length per second or per a fraction of a second (for example, half a second or one-fourth of a second) that is equal to standard moving velocity of the mobile objects M, a starting point (or an end point, a midpoint and so on, in other words, a predetermined position in the extending direction of the moving route RO) of every section RA having the same length is set as the path point RP. On top of that, as shown in FIG. 7, the path-point-data store unit 102 stores the path-point data containing latitude and longitude of each of the path points RP arranged along the moving route RO in association with an identifier used to identify this moving route RO. When the mobile object M is a vehicle or a robot, and besides the standard moving velocity of the mobile object M travelling on a road that is the moving route RO is 50 km/h, the migration length per second equal to the standard moving velocity of the mobile object M is 13.89 m, the migration length per half a second is 6.944 m, the migration length per one-fourth of a second is 3.472 m. Therefore the moving route RO is segmented into the sections RA each having a length (or distance) of 13.89 m, 6.944 m or 3.472, the path-point data is obtained with respected to each of the sections RA and stored by the path-point-data store unit 102.

The latitude and the longitude of each of the path points RP constituting the path-point data are values with prescribed digits each. When significant figures of the latitude and the longitude are six digits after the decimal point, resolution of the latitude and the longitude is about 0.11 m in the latitudinal direction and about 0.09 m in the longitudinal direction in Japan.

As shown in FIG. 7, the path-point data may contain height (it may be altitude or height above sea level) of each of the path points RP along the moving route RO. It is possible to represent grade-separated junctions of a plurality of the moving routes RO, viaducts, underground tunnel roads, flying or floating routes RO of the mobile objects M that are flying objects by giving the height to each of the path-points RP.

When the mobile objects M are vehicles or robots travelling on the roads RO, the path points RP provided for the sections RA each may be predetermined positions in a width direction that crosses (in particular, is orthogonal to) a direction along which the roads RO extend, for example, the positions on carriageway markings. The carriageway markings are lines painted on a road surface or constructed by raised pavement markers (or chatter bars), stones and so on fixed on the road surface, the carriageway markings including the items listed below:

"Outside lane line" An outside lane line is one kind of the carriageway markings drawn near a roadside to demarcate an outermost boundary of a carriageway. A side strip that vehicles are prohibited from proceeding down in principle is outside of the outside lane line, traffic lanes that vehicles may proceed down are inside of the outside lane line.

"Center line" A center line is one kind of the carriageway markings drawn to separate traffic of vehicles going in different directions. In actuality, the center line is often indicated not only with a painted line but also with structures such as rumble strips, raised road markers, lane segregation marks (center poles, post cones), and median strips.

"Lane boundary line" A lane boundary line is a border line to demarcate two traffic lanes adjacent to each other when two or more traffic lanes that vehicles proceed down in the same direction exist.

Figure 8:
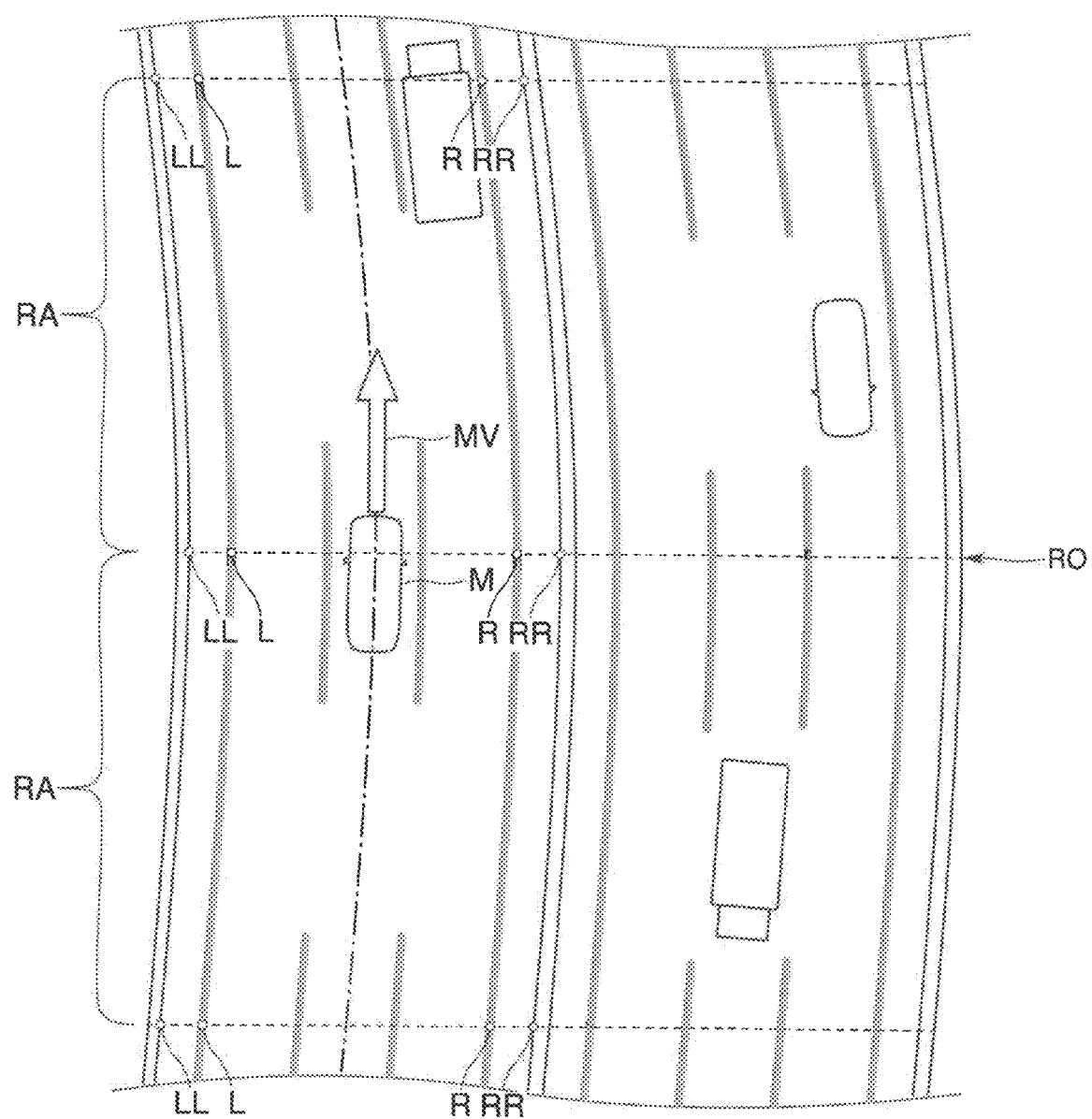
FIG. 8 is a diagram showing mobile objects, moving routes, sections of those and carriageway markings according to the embodiment.

For example, as shown in FIG. 8, the starting points of the sections RA of the roads, which are the moving routes RO for the mobile objects M, on a left outside lane line L, a right outside lane line (it may be equivalent to a center line) R, a lane boundary line (or a vehicle-traffic-lane boundary line), a left side traffic barrier LL, and/or, a right side traffic barrier RR are considered the path points RP, the path-point-data store unit 102 stores the latitude and the longitude of each of the path points RP and the height of each of the path points RP in association with the identifier used to identify the moving route RO. The side traffic bathers LL, RR include rumble strips, raised road markers, lane segregation marks, median strips, noise walls, guardrails, curbs, poles and building structures existing outside of the outside lane line or the center line, the side traffic bathers LL, RR preventing the mobile objects M from moving, proceeding or passing.

Incidentally, when the computer 1 constituting the mobile-object control system is installed in the mobile object M, the computer 1 may steer the mobile object M or control the moving velocity of the mobile object M using the path-point data stored by the path-point-data store unit 102.

In detail, first, the computer 1 searches the path-point-data store unit 102 for the path-point data having the nearest latitude and longitude to latitude and longitude of the current position of the mobile object M. The computer 1 iteratively obtains the latitude and the longitude of the current position of the mobile object M in every unit time using the function of the satellite-navigation-signal receiver 1n mounted on the mobile object M in advance. Next, the computer 1 reads the path-point data of the successive sections RA that the mobile object M will enter hereafter from the path-point-data store unit 102, the sections RA belonging to the same moving route RO to which the founded nearest latitude and longitude to the current position of the mobile object M belongs. For example, the computer 1 reads sets of the latitude, the longitude and the height of the path points RP of the sections RA in the route RO that the mobile object M will enter within a certain period of time from the present (for instance, when the moving route RO is segmented at regular intervals corresponding to the migration length per second in order to generate the path-point data, the computer 1 reads ten sets of the latitude, the longitude and the height of ten path points RP that the mobile object M will enter within ten seconds from the present).

Then, the computer 1 calculates a proper track of movement of the mobile object M in future or an apposite driving line while the mobile object M travels on the road based on the path-point data. For example, the computer 1 reads the latitude and the longitude of the path points RP of the sections RA in the moving route RO that the mobile object M will enter hereafter, and calculates the direction in which a straight or curved line between the path points RP extends, namely, the extending direction of the moving route RO.

At the same time, the computer 1 calculates the current moving direction MV of the mobile object M based on the latitude and the longitude of the current position of the mobile object M obtained iteratively. It is possible to elucidate which direction the mobile object M goes in by referring to the difference between the latitude and the longitude of the latest position of the mobile object M obtained just now and the latitude and the longitude of the position of the mobile object M obtained in the recent past.

On top of that, the computer 1 determines the steering direction and/or amount so as to reduce the difference between the vector of the moving direction MV of the mobile object M and the vector of the extending direction of the moving route RO, and manipulates the steering device 1k.

Also, the computer 1 may output the steering direction and/or amount to reduce the difference in such a way to appeal to visual or auditory perception of a person on the mobile object M, that is, display in a screen of the display device 1i or output sound through the audio output device 1j. Thereby the person on the mobile object M can receive advance notice about steering during autonomous control, automatic driving or semiautomatic driving of the mobile object M, or the appropriate steering amount when the person steers the mobile object M.

In addition, the computer 1 controls output of the engine or motor which is the power source 1l of the mobile object M based on the height of each of the path points RP that the path-point data with respect to the sections RA of the route RO read from the path-point-data store unit 102. It is possible to elucidate whether the mobile object M is coming to an uphill road or a downhill road by referring to the height of the sections RA of the moving route RO that the mobile object M will enter hereafter. The difference in height between the successive sections RA indicates the incline of the road surface. Hence, the computer 1 judges whether the section RA of the moving route RO that the mobile object M will enter hereafter is an uphill road or a downhill road, calculates the incline of the road surface, and accordingly increases or decreases the output of the power source 1l mounted on the mobile object M so as to suppress variation in the moving velocity of the mobile object M owing to ups and downs of the moving routes RO.

The computer 1 may output information on whether the output of the power source 1l increases or decreases in order to suppress the variation in the moving velocity and/or information on the increasing or decreasing amount of the output in order to suppress the variation in the moving velocity in such a way to appeal to the visual or auditory perception of the person on the mobile object M, that is, display in the screen of the display device 1i or output sound through the audio output device 1j. Thereby the person on the mobile object M can receive advance notice about controlling the output of the power source 1l during autonomous control, automatic driving or semiautomatic driving of the mobile object M, or the appropriate operation amount when the person operates an accelerator pedal of the mobile object M.

Thus the computer 1 can carry out the steering or the control of the moving velocity of the mobile object M based on the path-point data of the sections RA on the moving route RO along which the mobile object M moves and transition of the current position of the mobile object M.

The path-point data may be generated only after the person on the mobile object M decides on a destination to which the mobile object M moves. For example, the person on the mobile object M operates an automotive navigation system installed in the mobile object M and inputs the destination, the automotive navigation system searches for and determines the moving route RO from the current position of the mobile object M to the destination, and thereafter the computer 1 of the mobile-object control system performs the process of generating the path-point data of the sections RA into which the moving route RO is segmented and storing the path-point-data store unit 102 with the path-point data.

As a supplement to the path-point data stored by the path-point-data store unit 102, as shown in FIG. 7, with respect to each of the path points RP belonging to the moving routes RO, information on commands for instructing what actions the mobile objects M that have arrived at the path-point RP or in the neighborhood thereof and is heading for the next path-point RP should do may be added. As specific examples of the commands, one specifying the moving velocity of the mobile object M after arriving at the target path point RP or in the neighborhood thereof, one specifying wait time for which the mobile object M after arriving at the target path point RP or in the neighborhood thereof should be not operated or be stopped, one to remove the mobile object M after arriving at the target path point RP or in the neighborhood thereof from the moving routes or the space, and so on can be cited. Those commands are referred to in simulation of moving of each of the mobile objects M performed by the simulation unit 105 described below.

It is possible for one of the commands to indicate a point of view and/or a direction of a sight line of the virtual person on the mobile object M after the mobile object M arrives at the target path point RP or in the neighborhood thereof. This command defines a position coordinate of the point of view of the person in the virtual cube C symbolizing the mobile object M, and an azimuth angle and an elevation/depression angle (i.e. an angle of elevation and/or an angle of depression. For instance, the elevation angle above horizontal has a positive value, the depression angle below horizontal has a negative value) of the direction of the sight line from the point of view. The cubes C symbolizing the mobile objects M are formed into a rectangular parallelepiped similarly to the cubes C symbolizing the objects other than the mobile objects M. Also, each of the cubes C has flat dimensions, namely, the width in a horizontal x direction and the width in a horizontal y direction orthogonal to the x direction, and has height in a z direction perpendicular to both the x direction and the y direction. The position coordinate of the point of view of the person is represented as a three-dimensional coordinate [x, y, z] that is a set of a position in the x direction of the cube C symbolizing the mobile object M, a position in the y direction of the same cube C and a position in the z direction of the same cube C. This command may be referred to in outputting an image of a result of the simulation by the output unit 106 described below.

Moreover, the path-point-data store unit 102 stores information for defining the flat dimensions and the height of the virtual cubes C symbolizing the mobile objects M that move along the moving route RO, intervals at which (the cube C symbolizing) the mobile objects M come out in the simulation, and so on, those are components of the path-point data with respect to each of the moving routes RO. For example, values [1.48, 3.4, 2, 90, 10, 5] mean that the cube C symbolizing the mobile object M has a width of 1.48 in the x direction, a width of 3.4 m in the y direction and a height of 2 m, the azimuth of the mobile object M at a point in time when the mobile object M comes out is 90°, the mobile objects M come out at 10 second intervals, and besides the upper limit to number of the mobile objects M coming out (or the upper limit to number of the mobile objects M existing at the same time in the space) is 5. The direction to which the cube C symbolizing the mobile object M faces is equivalent to the moving direction of the advancing mobile object M or the reverse direction of the moving direction of the retrogressing mobile object M. As shown in FIG. 5, the azimuth of the cube C symbolizing the mobile object M indicates which direction the azimuth vector MV or the vector of the moving direction MV points in the space, the azimuth vector MV extending from the specific vertex P2 [x, y]=[0, 0] of the cube C along the y axis of the cube C such that the value of y is negative. The cube C that is not given the azimuth angle faces so that the azimuth vector MV extends toward the due north. Hence, it is equivalent to setting the azimuth angle of the cube C to 0° that the azimuth angle of the cube C is not specified. The path-point-data store unit 102 stores the above information on (the cube C symbolizing) the mobile object M moving along the moving route RO in association with the identifier used to identify the moving route RO.

Information on color of the mobile object M moving along each of the moving routes RO and so on may be further added as the path-point data.

The sign-data store unit 103 stores sign data containing coordinates of sign objects SO that influences the moving velocity or the moving direction MV of the mobile objects M moving in the space and content of instructions regarding the moving velocity or the moving direction MV that the sign objects SO give to the mobile objects M which catch the sign objects SO within a prescribed range from the mobile objects M into a necessary memory area of the main memory 1b or the auxiliary memory device 1c.

Figure 9:
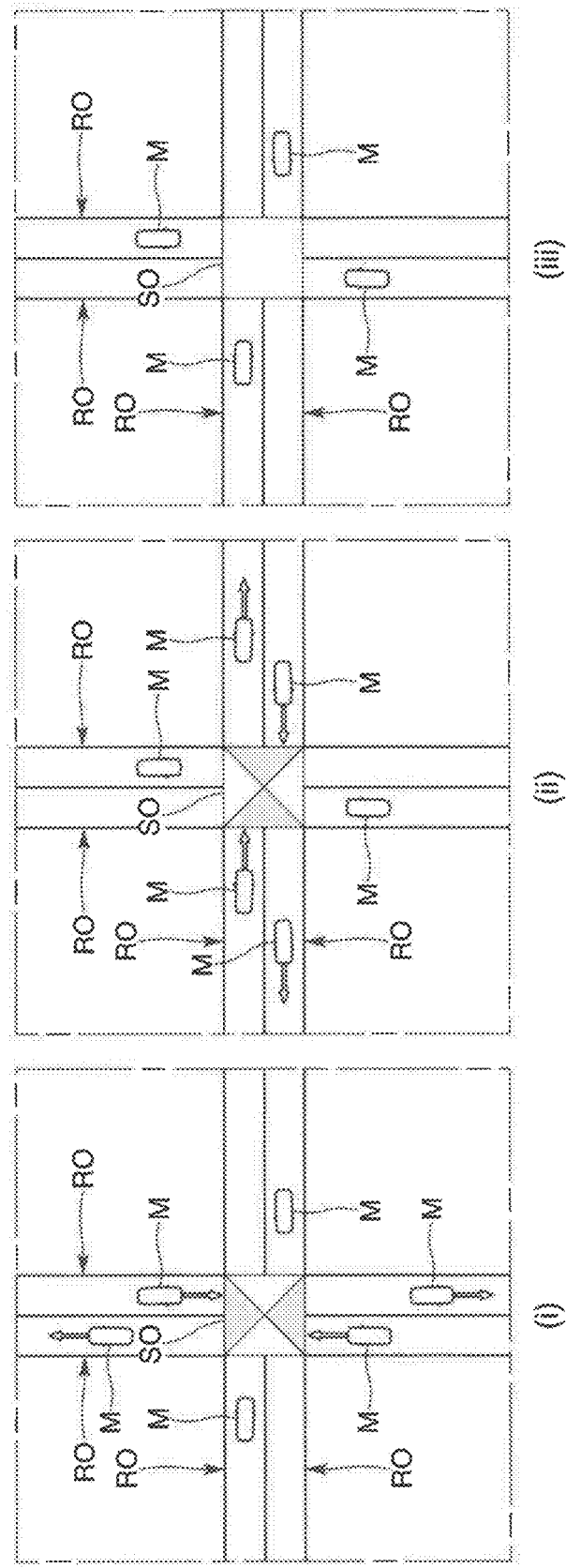
FIG. 9 is a diagram showing mobile objects, moving routes and a sign object according to the embodiment.
Figure 12:
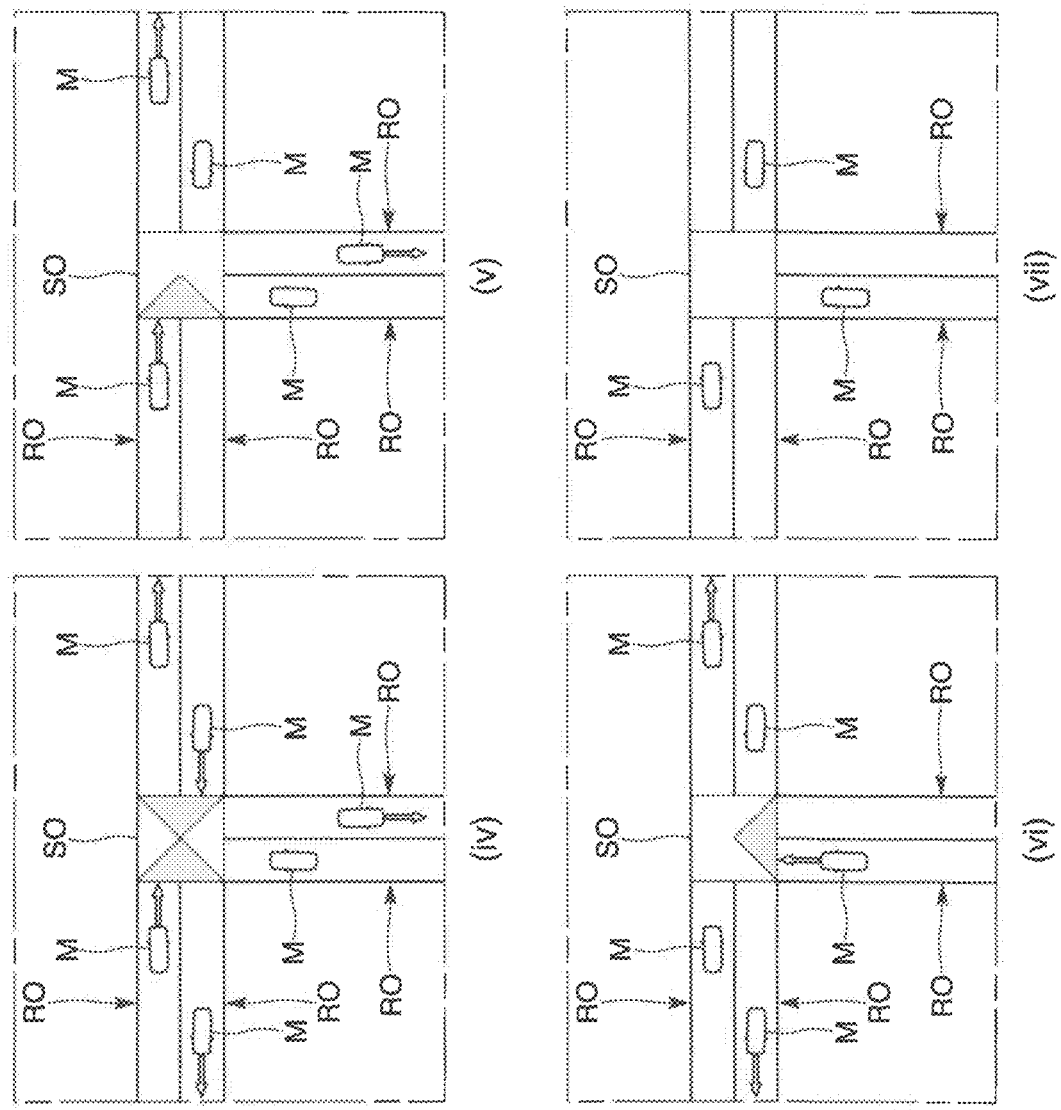
FIG. 12 is a diagram showing mobile objects, moving routes and a sign object according to the embodiment.

A specific account of the sign object SO will be given. As shown in FIGS. 9 and 12, each of the sign objects SO is provided on the moving routes RO for the mobile objects M or in the neighborhoods thereof so as to vary the moving velocity and/or the moving direction MV of the mobile objects M when the mobile objects M or the persons on the mobile objects M detect or recognize the sign object SO. The sign object SO functions, so to speak, as a traffic signal or a traffic sign in the real world. There are several types of the sign objects SO, that is, a "temporary stop sign", a "velocity sign", an "azimuth sign", and an "intersection sign". The temporary stop sign, the velocity sign and the azimuth sign do not have states changing over time (or those have a constant state), however, the intersection sign has states changing every minute over time.

The temporary stop sign is the sign object SO to temporarily stop the mobile object M for a predetermined time and restart the mobile object M after the predetermined time elapses. When the mobile object M approaching the temporary stop sign detects or recognizes it, the mobile object M temporarily stops for the time indicated by the temporary stop sign, the mobile object M thereafter restarts toward the moving direction MV before the temporary stop and accelerates again to the moving velocity before the temporary stop.

The velocity sign is to increase or decrease the moving velocity of the mobile object M to a predetermined rate. When the mobile object M approaching the velocity sign detects or recognizes it, the mobile object M accelerates or decelerates to the rate indicated by the velocity sign keeping the moving direction MV.

The azimuth sign is to change the moving direction MV of the mobile object M to a predetermined azimuth. When the mobile object M approaching the azimuth sign detects or recognizes it, the mobile object M turns toward the azimuth indicated by the azimuth sign keeping the moving velocity.

The intersection sign has at least two possible states. In an example shown in FIG. 9, the intersection sign alternates between a state (i) and a state (ii). This intersection sign is provided in an intersection where one moving route RO and another moving route RO cross each other to control traffic so that the mobile objects M moving along the former moving route RO does not collide with the mobile objects M moving along the latter moving route RO. In the state (i), movement of the mobile objects M along the moving route RO extending in the south and north direction (vertical in FIG. 9) is permitted while movement of the mobile objects M along the moving route RO extending in the east and west direction (horizontal in FIG. 9) is prohibited. The moving velocity of the mobile objects M prohibited from moving becomes 0. By contrast, in the state (ii), the movement of the mobile objects M along the moving route RO extending in the south and north direction is prohibited while the movement of the mobile objects M along the moving route RO extending in the east and west direction is permitted. A state (iii) is a transient state from the state (i) to the state (ii) or from the state (ii) to the state (i), the movement of the mobile objects M along the moving route RO extending in the south and north direction and the movement of the mobile objects M along the moving route RO extending in the east and west direction are prohibited in the state (iii).

In the example shown in FIG. 9, colored portions in the sign object SO symbolize green lights, uncolored portions in the sign object SO symbolize red lights. When, in front of the mobile object M along the moving direction MV, the colored portion is closer than the uncolored portion from the mobile object M, the movement of the mobile object M is not prohibited by the intersection sign. On the other hand, when the uncolored portion is closer than the colored portion from the mobile object M in front of the mobile object M along the moving direction MV, and besides the mobile object M approaches the uncolored portion within a prescribed range of distance, the movement of the mobile object M is prohibited by the intersection sign as a result of detection or recognition of the intersection sign by the mobile object M.

As shown in FIG. 10, according to this embodiment, with respect to each of the sign objects SO set in the space, the sign-data store unit 103 stores the type of the sign object SO, the position coordinate [latitude, longitude] of the sign object SO, significant figures of the latitude and the longitude, information on the content of the instruction that the sign object SO gives to the mobile objects M, and the distance SR that the mobile objects M (or the persons on those) detect (or recognize) the sign object SO within, in association with an identifier used to identify this sign object SO.

When the sign object SO is the temporary stop sign, the content of the instruction that the sign object SO gives to the mobile objects M contains length of the time for which the mobile object M temporarily stops. When the sign object SO is the velocity sign, the content of the instruction that the sign object SO gives to the mobile objects M contains the rate of the mobile object M moving. The moving rate may be an absolute value (i.e. the moving velocity itself that the mobile object M should have hereinafter) or a relative value (i.e. the variation amount by which the moving velocity of the mobile object M should be increased or decreased hereinafter. For instance, a relative rate of −10 km/h means that the moving velocity of the mobile object M should be decreased by −10 km/h from the current velocity, the consequent moving velocity of the mobile object M depends on the moving velocity before being decreased).

When the sign object SO is the azimuth sign, the content of the instruction that the sign object SO gives to the mobile objects M contains an azimuth angle and/or an elevation/depression angle of a vector to which the mobile object M should head. The azimuth angle and/or the elevation/depression angle may be an absolute value (i.e. the azimuth angle and/or the elevation/depression angle of the vector itself to which the mobile object M should be guided hereinafter) or a relative value (i.e. the variation amount by which the moving direction MV of the mobile object M should be altered hereinafter.

For instance, a relative azimuth angle of 90° means that the mobile object M should turn right by 90° from the current moving direction MV, the consequent moving direction MV of the mobile object M, which may be eastward, westward, southward or northward, depends on the moving direction MV before being altered).

It is possible to set special azimuth signs, such as one that influences only the mobile objects M above itself, and one that influences only the mobile objects M below itself. For example, the former azimuth sign may make the mobile objects M fling or floating higher than the azimuth sign descend by altering the moving direction MV of the mobile objects M downward (or by decreasing the elevation/depression angle), the latter azimuth sign may make the mobile objects M fling or floating lower than the azimuth sign ascend by altering the moving direction MV of the mobile objects M upward (or by increasing the elevation/depression angle).

When the sign object SO is the intersection sign, each of possible states that the intersection sign has, duration of time for which each of the states continues, and each interval for which a transient state from each of the state to the following state continues are expressed in order of the states. For example, values [S1, 20, 3, S2, 30, 3] included in the sign data with respect to one intersection sign mean that, first the intersection sign should be in the state (i) for 20 seconds, next the intersection sign should be in the transient state (iii) for 3 seconds, after that the intersection sign should be in the state (ii) for 30 seconds, finally the intersection sign should be in the transient state (iii) for 3 seconds and subsequently transit to the state (i) so as to iterate those.

Figure 11:
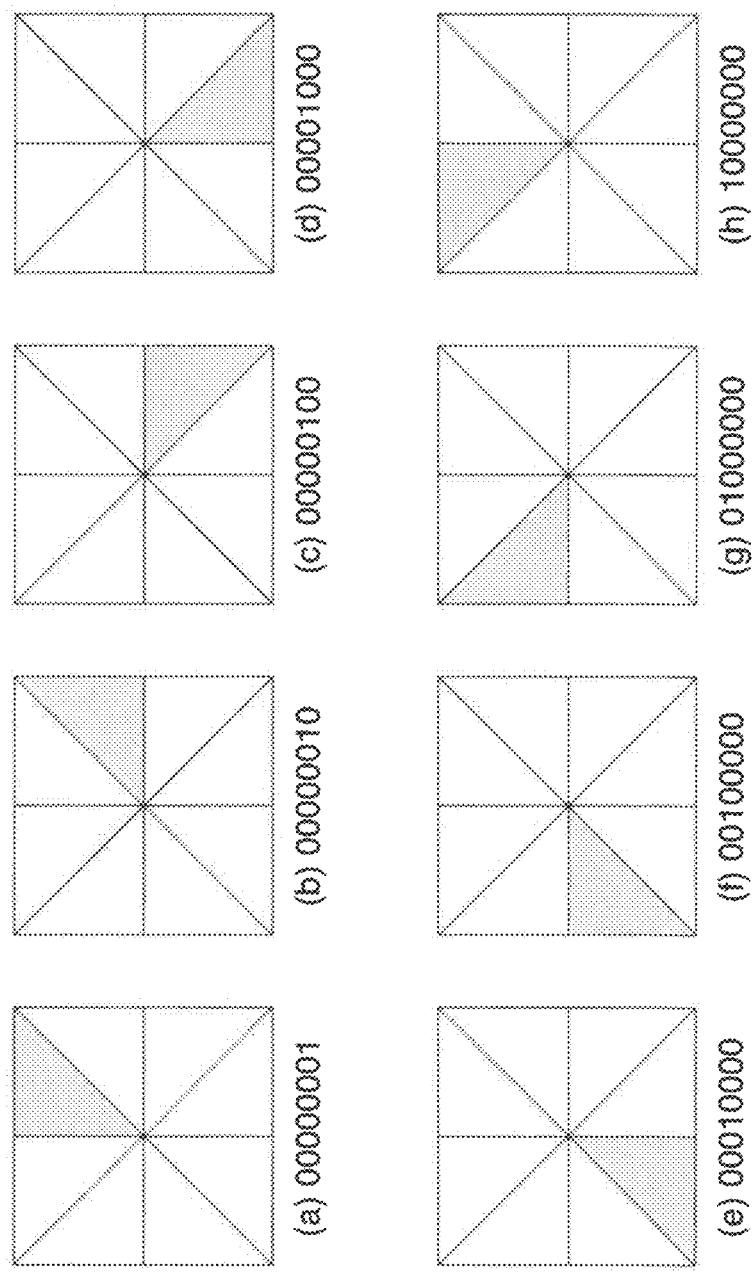
FIG. 11 is a diagram showing definitions of states of an intersection sign according to the embodiment.

It is possible to define the possible states of the intersection sign in a more complex manner. For example, as a prerequisite, one intersection sign has eight possible states shown in FIG. 11 to be expressed by 8-bit values. A state (a) is expressed by 00000000, a state (e) is expressed by 00010000. On that basis, the sum of the 8-bit values that are assigned to the eight states shown in FIG. 11 each can express combination of two or more of the eight states. For instance, the state (i) shown in FIG. 9 is expressed by 10011001 because the state (i) is the combination of the states (a), (d), (e) and (h) shown in FIG. 11. The sign data [S1, 20, 3, S2, 30, 3] with respect to the intersection sign can be transliterated as [10011001, 20, 3, 01100110, 30, 3].

It is also possible to provide the intersection sign like a time-difference-system traffic light using the above expression for the eight states. [01100110, 30, 0, 01100000, 20, 3, 00011000, 30, 3] expresses the intersection sign that is in a state (iv), a state (v) and a state (vi) in order (and returns to the state (iv) after the state (vi)), and besides is in a transient state (vii) between the state (v) and the state (vi) and between the state (vi) and state (iv) as shown in FIG. 12. The interval with respect to the state (iv) is set to 0 because the intersection sign is not in the transient state (vii) when transiting from the state (iv) to the state (v).

As shown in FIG. 10, with respect to each of the sign objects SO, values to directly specify flat dimensions of the sign object SO, namely, the width in a horizontal x direction and the width in a horizontal y direction orthogonal to the x direction may be added. The sign object SO that is not given the values of the flat dimensions has the width in the x direction (longitudinal direction) and the width in the y direction (latitudinal direction) depending on the significant figures of the latitude and the longitude of the position coordinate of the grid where the sign object SO exists. That is, the significant figures of the latitude and the longitude of the position coordinate of the sign object SO indirectly specify the flat dimensions of the sign object SO occupying the grid.

As shown in FIG. 10, with respect to each of the sign objects SO, information on an azimuth angle defining the direction of the sign object SO may be added. Similarly to the azimuths CV and MV of the cubes C, the azimuth of the sign object SO indicates which direction the azimuth vector points in the space, the azimuth vector extending from a specific vertex [x, y]=[0, 0] of the sign object SO along the y axis of the sign object SO such that the value of y is negative. The sign object SO that is not given the azimuth angle faces so that the azimuth vector extends toward the due north. Hence, it is equivalent to setting the azimuth angle of the sign object SO to 0° that the azimuth angle of the sign object SO is not specified.

Figure 13:
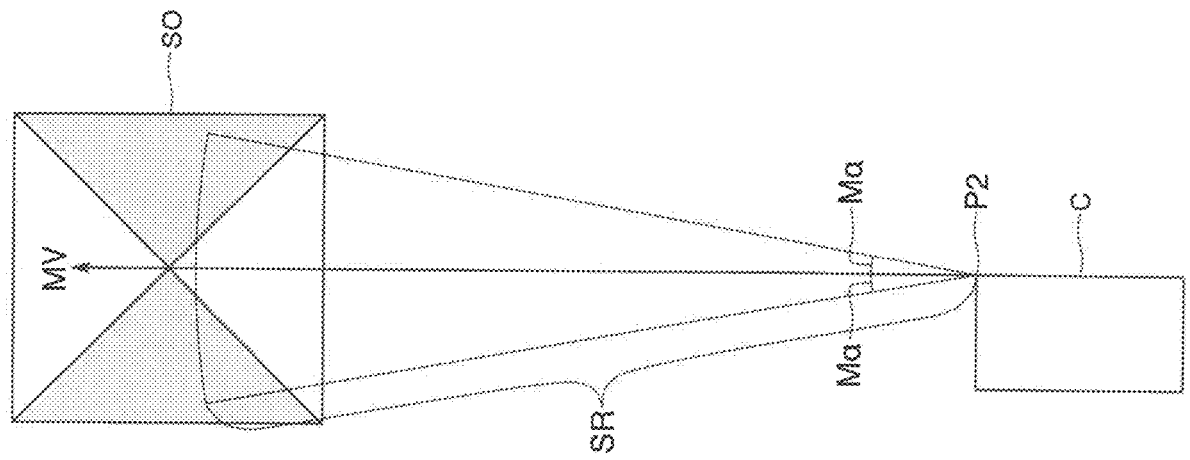
FIG. 13 is a schematic diagram in a plan view showing a range within which a mobile object can detect a sign object according to the embodiment.

The detection distance SR of the sign object SO indicates the distance within which the mobile objects M detect the sign object SO. Only the sign object SO detected by the mobile object M (or being close to the mobile object M such that it is detected) influences the moving velocity or the moving direction MV of the mobile object M. The sign object SO not detected by the mobile object M (or being distant from the mobile object M such that it is not detected) does not influences the moving velocity and the moving direction MV of the mobile object M. The condition for detecting the sign object SO by the mobile object M is as follows. That is, as shown in FIG. 13, a detection range is defined as a region that is within a predetermined angle of view Ma in a situation of looking ahead in the moving direction MV of the mobile object M from a specific point, for example, the specific vertex P2 [x, y]=[0, 0] in the cube C symbolizing the mobile object M, and within the detection distance SR from the specific point. On that basis, when at least a part of the sign object SO is within the detection range, the mobile object M detects the sign object SO. The angle of view Ma to determine the detection range is set to an extent of, for instance, 10° left and 10° right from the moving direction MV of the mobile object M (that is, 2Mα=20°).

The detection distance SR to determine the detection range is a component of the sign data with respect to each of the sign objects SO, the detection range for each of the sign objects SO may not be uniform. The sign object SO given a long detection distance SR can be easily detected by even the mobile object M that is far away from the sign object SO, the sign object SO given a short detection distance SR cannot be detected by the mobile object M unless the mobile object M approaches the sign object SO.

Where the sign object SO is the intersection sign, the movement of the mobile object M is permitted by the intersection sign when the colored portion of the intersection sign is closer than the uncolored portion thereof from the cube C symbolizing the mobile object M and besides overlaps with the detection range from the specific point of the same cube C. On the other hand, the movement of the mobile object M is prohibited by the intersection sign when the uncolored portion of the intersection sign is closer than the colored portion thereof from the cube C symbolizing the mobile object M and besides overlaps with the detection range from the specific point of the same cube C.

The sign objects SO can be presumed to be three-dimensional solids formed into a rectangular parallelepiped similarly to the cubes C symbolizing the objects or the mobile objects M. In this instance, each of the sign objects SO has height in a z direction perpendicular to both the x direction and the y direction as well as the flat dimensions, namely, the width in the horizontal x direction and the width in the horizontal y direction orthogonal to the x direction. As shown in FIG. 10, with respect to each of the sign objects SO formed into a rectangular parallelepiped, the sign data contains information on the height and above ground level as well as the flat dimensions. The above ground level of the sign object SO means a height position (it may be altitude or height above sea level) of a lower surface of the sign object SO. The sign object SO to control the moving velocity or the moving direction MV of the mobile objects M moving through an underground tunnel may exist under the ground, the above ground level of the sign object SO may be a negative value. The sign object SO to control the moving velocity or the moving direction MV of the mobile objects M flying or floating in the air may exist in the air, the above ground level of the sign object SO may be a comparatively large positive value.

Figure 14:
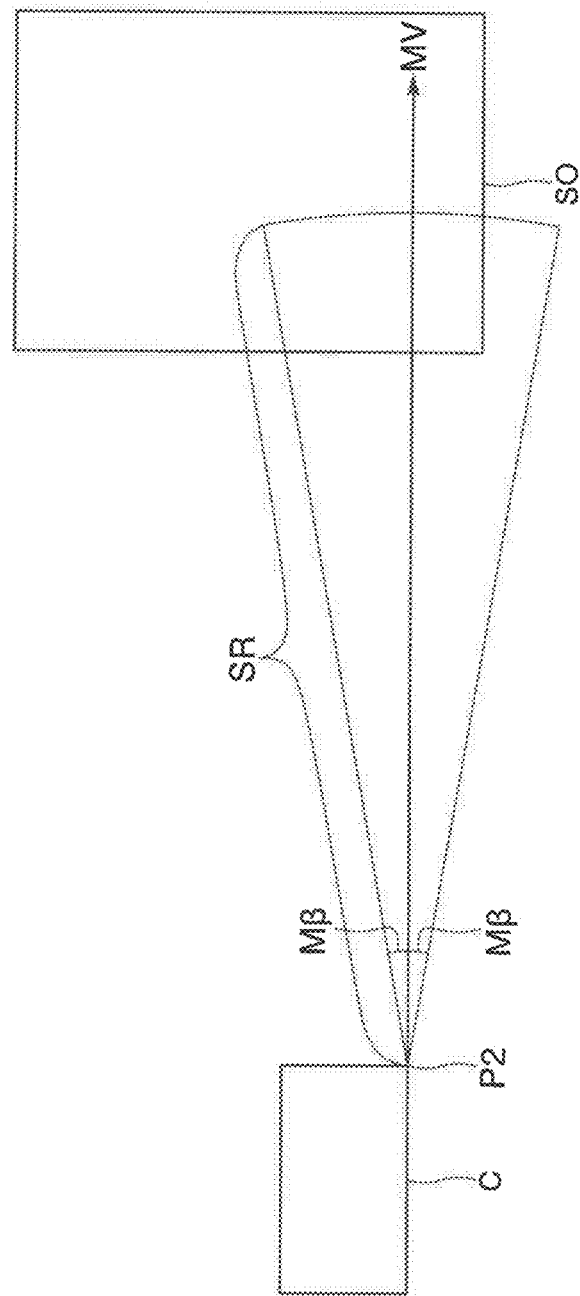
FIG. 14 is a schematic diagram in a side view showing the range within which the mobile object can detect the sign object according to the embodiment.

Furthermore, as shown in FIG. 14, it is possible to expand the detection range from the specific point in the cube C symbolizing the mobile object M upward and downward into a three-dimensional region. Specifically, the detection range is defined as a region that is within a predetermined angle of view Mα measured horizontally and a predetermined angle of view Mβ measured vertically in a situation of looking ahead in the moving direction MV of the mobile object M from the specific point, for example, the specific vertex P2 [x, y, z]=[0, 0, 0] in the cube C symbolizing the mobile object M, and has a maximum horizontal distance (or distance excluding difference in height) from the specific point that is equal to or shorter than the detection distance SR. On that basis, when at least a part of the sign object SO is within the detection range, the mobile object M detects the sign object SO. The angle of view Mβ to determine the detection range is set to an extent of, for instance, 10° up and 10° down from the moving direction MV of the mobile object M (that is, 2Mβ=20°). Such configuration can provide the sign object SO that influences the mobile objects M traveling on the ground but does not influence the mobile objects M flying or floating in the air, or the sign object SO that influences the mobile objects M flying or floating in the air but does not influence the mobile objects M traveling on the ground.

Some of the sign objects SO set in the space may influence all the mobile objects M existing in the space, others may influence only the mobile objects M moving along specific moving routes RO (and may not influence the mobile objects M moving along the other moving routes RO). When the latter sign object SO enters the detection range of the mobile object M moving along the specific moving route RO, the moving velocity or the moving direction MV of this mobile object M is altered by this sign object SO. However, when the latter sign object SO enters the detection range of the mobile object M moving along the moving routes RO other than the specific moving route RO, the moving velocity or the moving direction MV of this mobile object M is not altered by this sign object SO.

With respect to the sign object SO that influences only the mobile objects M moving along the specific moving route RO, the sign data stored by the sign-data store unit 103 additionally contains an identifier used to identify the target moving route RO that the sign object SO influences. The sign object SO that the identifier used to identify the target moving route RO is not added to the sign data on generally influences the mobile objects M regardless of the moving routes RO.

The mobile-object-data store unit 104 stores mobile-object data containing at least a position coordinate of the current position, the moving velocity and the moving direction MV of each of a plurality of the mobile objects M into a necessary memory area of the main memory 1b or the auxiliary memory device 1c.

As shown in FIG. 15, according to this embodiment, with respect to each of the cubes C symbolizing each of the mobile objects M, the mobile-object-data store unit 104 stores the identifier used to identify the route RO along which the cube C (or the mobile object M symbolized by the cube C) should move, the current position coordinate [latitude, longitude] of the cube C, significant figures of the latitude and the longitude, information on desired moving velocity and an azimuth angle of a desired moving direction of the cube C, and the current moving velocity and the current moving direction MV of the cube C, in association with an identifier used to identify this cube C.

The current position of the cube C symbolizing the mobile object M is equal to the position of the specific vertex P2 [x, y, z]=[0, 0, 0] of the cube C.

The desired moving velocity is given by the command set at each of the path-points RP through which the mobile object M passes or each of the sign objects SO (in particular, the velocity signs) that the mobile object M approaches. The desired moving direction is determined based on, when the mobile object M moves from one of the path points RP to the following path point RP along the moving route RO, the position coordinates of both of those path points RP in principle. Specifically, a vector parallel to a line segment between one path point RP at which the mobile object M has already arrived and the following path point RP for which the mobile object M leaves from now on, or a vector parallel to a line segment between the current position of the mobile object M and the following path point RP is the desired moving direction. The desired moving direction may be given by the command set at each of the path-points RP through which the mobile object M passes or each of the sign objects SO (in particular, the azimuth signs) that the mobile object M approaches.

The desired moving velocity and the desired moving direction are the moving velocity and the moving direction to be achieved by the cube C symbolizing the mobile object M. However, the current moving velocity and the current moving direction MV of the mobile object M are not always equal to the desired moving velocity and the desired moving direction. For example, while the mobile object M arriving at one path point RP is making a 90° right turn due to the command set at the path point RP, the azimuth angle of the desired moving direction is instantly altered by 90°, but the azimuth angle of the current moving direction MV is gradually altered according to the alternation of the desired moving direction and will be equal to the azimuth angle of the desired moving direction only after a certain time elapses. Similarly, the current moving velocity is gradually increased or decreased according to an alternation of the desired moving velocity. Also, the current moving velocity may be decreased because the mobile object M is influenced by the sign object SO (in particular, the temporary stop sign or the intersection sign) that the mobile object M has approached, or when the mobile object M has approached the cube C symbolizing another mobile object M existing ahead within a prescribed range of distance.

In addition, as shown in FIG. 15, with respect to each of the cubes C symbolizing each of the mobile objects M, information on above ground level thereof may be added. The above ground level of the cube C means a height position (it may be altitude or height above sea level) of a lower surface of the mobile object M symbolized by this cube C. When the mobile object M moves through an underground tunnel, the above ground level of the cube C symbolizing the mobile object M may be a negative value. The above ground level of the cube C symbolizing the mobile object M flying or floating in the air may be a comparatively large positive value.

Further, with respect to each of the cubes C symbolizing each of the mobile objects M, information on an elevation/depression angle of the desired moving direction and an elevation/depression angle of the current moving direction MV as well as the azimuth angle of the desired moving direction and the azimuth angle of the current moving direction MV may be added. Indicating the moving direction with both the azimuth angle and the elevation/depression angle makes it possible to represent the mobile object M that travels on a slope going uphill or downhill, or the mobile object M that is a flying object going upward or downward.

The simulation unit 105 iteratively calculates the coordinates, the moving velocity and the moving direction MV of each of the mobile objects M moving in the space in every unit time with reference to the path-point data stored by the path-point-data store unit 102, the sign data stored by the sign-data store unit 103 and the mobile-object data stored by the mobile-object-data store unit 104, and writes the calculated new coordinates, the calculated new moving velocity and the calculated new moving direction MV of each of the mobile objects M into the mobile-object-data store unit 104.

The position coordinate of each of the path points RP included by the path-point data, the position coordinate of each of the sign objects SO included by the sign data, and the position coordinate of each of the mobile objects M included by the mobile-object data each contain the latitude and the longitude. Now a concrete example of calculation methods for geodetic length between two points that am each defined by geographical coordinates in terms of latitude and longitude, and an azimuth of a vector from one of the points to the other point will be described. The following calculation method is extracted from a website of the Geospatial Information Authority of Japan.

Let $\varphi_1$ and $L_1$ be latitude and longitude of one of the points, let $\varphi_2$ and $L_2$ be latitude and longitude of the other point. Note that north latitude is positive and south latitude is negative, east longitude is positive and south longitude is (360°−longitude). When $L=L_2-L_1$ is negative, let $\varphi_2$ and $L_2$ be latitude and longitude of one of the points, let $\varphi_1$ and $L_1$ be latitude and longitude of the other point so that L is positive. Let a and f be the semi-major axis and flattening of an earth ellipsoid (reference ellipsoid).

$L=L_2-L_1$; $=180°-L$ $(0°\leq L\leq 180°)$
$\Delta=\varphi_2-\varphi_1$; $\Sigma=\varphi_1+\varphi_2$
$u_1=\tan^{-1}[(1-f) \tan \varphi_1]$; $u_2=\tan^{-1} [1-f) \tan \varphi_2]$
$\Sigma'=u_1+u_2$; $\Delta'=u_2-(-180°\leq\Sigma'\leq 180°, -180°\leq\Delta'\leq 180°)$
$\xi=\cos (\Sigma'/2)$; $\xi'=\sin (\Sigma'/2)$
$\eta=\sin (\Delta'/2)$; $\eta'=\cos (\Delta'/2)$
$x=\sin u_1 \sin u_2$; $y=\cos u_1 \cos u_2$
$c=y \cos L+x$
$\varepsilon=[f(2-f)]/[(1-f)^2]$ After this, calculation formulae are partly different depending on the value of c. A case where $c\geq 0$ is defined as Zone 1, a case where $0>c\geq -\cos (3° \cos u_1)$ is defined as Zone 2, a case where $c<-\cos (3° \cos u_1)$ is defined as Zone 3.

With respect to the initial value $\theta_{(0)}$ of $\theta$, $\theta_{(0)}=L(1+fy)$ in Zone 1, $\theta_{(0)}=L'$ in Zone 2. In Zone 3, the initial value $\theta_{(0)}$ of Zone 3(a) where $\Sigma=0$ is different from the initial value $\theta_{(0)}$ of Zone 3(b) where $\Sigma\neq 0$.

$R=f\pi \cos^2 u_1 [1-(1/4) f (1+\sin^2 u1+(3/16) f^2 \sin^4 u_1]$
$d_1$ L' $\cos u_1-R$; $d_2=|\Sigma'|+R$
$q=L'/(f\pi)$; $f_1=(1/4) f [1+(1/2)f]$; $\gamma 0=q+f_1 q-f_1 q^3$
The initial value $\theta_{(0)}$ in Zone 3(a) is calculated as below.
$A_0=\tan^{-1} (d_1/d_2) (-90°\leq\Delta_0\leq 90°)$
$B_0=\sin^{-1} [R/(d_1^2+d_2^2)^{-1/2}] (0°\leq B_0\leq 90°)$
$\psi=A_0+B_0$; $j=\gamma_0/\cos u_1$
$k=(1+f_1)|\Sigma'|/(1-fy)/(f\pi y)$; $j_1=j/(1+k \sec \psi)$
$\psi'=\sin^{-1} j_1 (0°\leq\psi'\leq 90°)$
$\psi''=\sin^{-1} (j_1 \cos u_1/\cos u_2) (0°\leq\psi''\leq 90°)$
$\theta_{(0)}=2 \tan^{-1} \{\tan [(\psi'+\psi'')/2] \sin (|\Sigma'|/2)/\cos (\Delta'/2)\}$ In Zone 3(b), if $d_1>0$, then the initial value $\theta_{(0)}=L'$. The calculation for the geodetic length and the azimuth when $d_1\leq 0$ in Zone 3(b) will be described later.

(Except in the case where $d_1\leq 0$ in Zone 3(b)) With reference to following calculation for $\theta$, $\theta_{(n)}\equiv\theta_{(0)}$ in the first operation, $\theta_{(n+1)}\equiv\theta_{(n)}$ in the second or later operation.
In Zone 1, $g=[\eta^2 \cos^2 (\theta_{(n)}/2)+\xi^2 \sin^2 (\theta_{(n)}/2)]^{-1/2}$
In Zone 2 or 3, $g=[\eta^2 \sin^2 (\theta_{(n)}/2)+\xi^2 \cos^2 (\theta_{(n)}/2)]^{-1/2}$
In Zone 1, $h=[\eta'^2 \cos^2 (\theta_{(n)}/2)+\xi'^2 \cos^2(\theta_{(n)}/2)]^{-1/2}$
In Zone 2 or 3, $h=[\eta'^2 \sin^2 (\theta_{(n)}/2)+\xi'^2 \cos^2 (\theta_{(n)}/2)]^{-1/2}$
$\sigma=2 \tan^{-1} (g/h)$; $J=2gh$; $K=h^2-g^2$
$\gamma=(y/J)\sin \theta_{(n)}$; $\Gamma=1-\gamma^2$; $\zeta=\Gamma K-2x$; $\zeta'=\zeta+x$
$D=(1/4) f (1+f)-(3/16) f^2\Gamma$
$E=(1-D\Gamma) f\gamma\{\sigma+DJ[\zeta+DK(2\zeta^2-\Gamma^2)]\}$
In Zone 1, $F=\theta_{(n)}-L-E$
In Zone 2 or 3, $F=\theta_{(n)}-L'+E$
$G=f\gamma^2(1-2D\Gamma)+f\zeta (\sigma/J)[1-D\Gamma+(1/2)f\gamma^2]+(1/4)f^2\zeta\zeta'$
$\theta_{(n+1)}=\theta_{(n)}-F/(1-G)$
In order to obtain $\theta$, the above operation should be iterated. It is preferable that above operation be iterated until $|F|<10^{-15}$.

(Except in the case where $d_1\leq 0$ in Zone 3(b)) With reference to the calculation for the geodetic length s,
$n_0=\varepsilon\Gamma/[(1+\varepsilon\Gamma)^{-1/2}+1]^2$; $A=(1+n^0)[1+(5/4)n_0^2]$
$B=\varepsilon[1-(3/8)n_0^2]/[(1+\varepsilon\Gamma)^{-1/2}+1]^2$
$s=(1-f)aA(\sigma-BJ\{\zeta-(1/4)B[K(\Gamma^2-2\zeta^2)-(1/6)B\zeta(1-4K^2)(3\Gamma^2-4\zeta^2)]\})$ (Except in the case where $d_1\leq 0$ in Zone 3(b)) With reference to the calculation for the azimuth $\alpha$ of the vector from the position of the mobile object M to the target point,
In Zone 1, $\alpha=\tan^{-1} [\xi \tan(\theta/2)/\eta]-\tan^{-1} [\xi' \tan (\theta/2)/\eta']$
In Zone 2 or 3, $\alpha=\tan^{-1} [\eta' \tan(\theta/2)/\xi']-\tan^{-1} [\eta \tan(\theta/2)/\xi]$
However, if the latitude and the longitude of one of the points is $\varphi_2$ and $L_2$, and besides the latitude and the longitude of the other point is $\varphi_1$ and $L_1$, then
In Zone 1, $\alpha=180°+\tan^{-1} [\xi \tan (\theta/2)/\eta]+\tan^{-1} [\xi \tan (\theta/2)/\eta\zeta]$
In Zone 2 or 3, $\alpha=360°-\tan^{-1} [\eta' \tan(\theta/2)/\xi']-\tan^{-1} [\eta \tan(\theta/2)\xi]$ When $d_1=0$ in Zone 3(b), with respect to the calculation for the geodetic length s and the azimuth $\alpha$,
$\Gamma=\sin^2 u_1$
$n_0=\varepsilon\Gamma/[(1+\varepsilon\Gamma)^{-1/2}+1]^2$; $A=(1+n_0)[1+(5/4)n_0^2]$
$s=(1-f)aA\pi$
$\alpha=90°$
However, if the latitude and the longitude of one of the points is $\varphi_2$ and $L_2$, and besides the latitude and the longitude of the other point is $\varphi_1$ and $L_1$, then $\alpha=270°$.

When $d_1<0$ in Zone 3(b), the geodetic length s and the azimuth $\alpha$ are calculated with following formulae. $\gamma_{(n)}\equiv\gamma_{(0)}$ in the first operation, $\gamma_{(n+1)}\equiv\gamma_{(n)}$ in the second or later operation.
$\Gamma=1-\gamma_{(n)}^2$; $D=(1/4) f (1+f)-(3/16)f^2\Gamma$
$\gamma_{(n+1)}=q/(1-D\Gamma)$
In order to obtain $\Gamma$ and D, the above operation should be iterated. It is preferable that above operation be iterated until $|\gamma_{(n)}-\gamma_{(n-1)}|<10^{-15}$.
$n_0=\varepsilon\Gamma/[(1+^{\varepsilon\Gamma})^{-1/2}+1]^2$; $A=(1+n_0)[1+(5/4)n_0^2]$
$s=(1-f)aA\pi$
$m=1-q \sec u_1$; $n=D\Gamma/(1-D\Gamma)$; $w=m-n+mn$
$\alpha=90°$ on the condition that $w\leq 0$
$\alpha=90°-2 \sin^{-1} (w/2)^{-1/2}$ on the condition that $w>0$
However, if the latitude and the longitude of one of the points is $\varphi_2$ and $L_2$, and besides the latitude and the longitude of the other point is $\varphi_1$ and $L_1$, then
$\alpha=270°$ on the condition that $w\leq 0$
$\alpha=270°+2 \sin^{-1} (w/2)^{-1/2}$ on the condition that $w>0$ Of course, the calculation method for the geodetic length and the azimuth is not limited to the above one. Vincenty's formulae, Hubeny's formulae and so on are known as more simple calculation methods (which require a smaller calculation amount but cause an error) and are available. It is also possible to calculate the width in the latitudinal direction of a unit degree of latitude and the width in the longitudinal direction of a unit degree of longitude in given territory [latitude, longitude] so as to determine uniform flat dimensions of one grid. For example, in Japan, the geodetic length and the azimuth may be calculated on the premise that 0.000001° of latitude and 0.000001° of longitude are 0.11 m and 0.09 m respectively.

Figure 16:
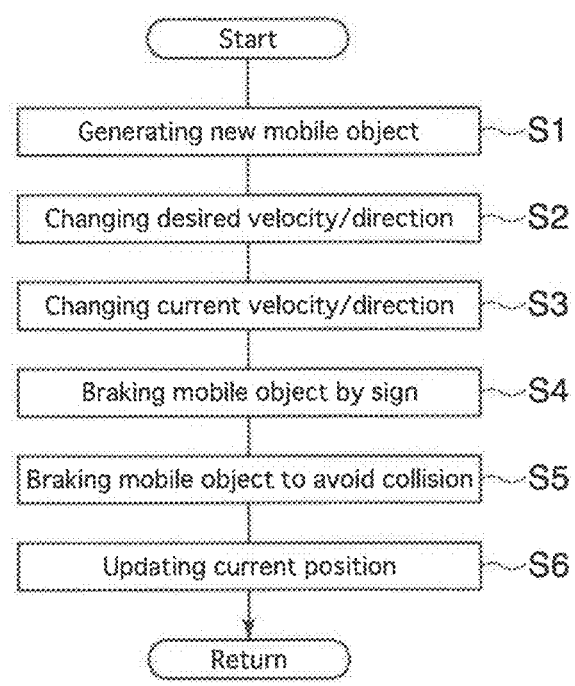
FIG. 16 is a diagram showing an example of a process that the mobile-object control system in the embodiment executes in accordance with a program.

A schema of the simulation process that the computer 1 functioning as the simulation unit 105 in the mobile-object control system executes in accordance with the programs is shown in FIG. 16. First, the simulation unit 105 generates, based on the path-point data, a new mobile object M to move along the moving route RO in a timely manner every moving route RO defined by the path-point data, and writes the mobile-object data containing the identifier used to identify the new mobile object M, the position coordinate of the new mobile object M, the desired moving velocity and the desired moving direction of the new mobile object M into the mobile-object-data store unit 104 (Step S1).

Next, the simulation unit 105 obtains the current position coordinate of each of the mobile objects M existing in the space based on the mobile-object data, and obtains the position coordinate of each of the path points RP existing in the space, the position coordinate and the dimensions of each of the sign objects SO existing in the space based on the path-point data and the sign data. When one of the mobile objects M has arrived at one of the path-points RP or in the neighborhood thereof, the simulation unit 105 refers to the command defined by the path-point data with respect to this path point RP to be given to this mobile object M that has arrived at this path-point RP or in the neighborhood thereof, changes the desired moving velocity and/or the desired moving direction of this mobile object M in compliance with the command, and writes the mobile-object data with respect to this mobile object M containing the changed desired moving velocity and/or the changed desired moving direction into the mobile-object-data store unit 104. In addition, when one of the sign objects SO, the velocity sign or the azimuth sign in particular, enters the detection range of one of the mobile objects M, the simulation unit 105 refers to the content of the instruction defined by the sign data with respect to this velocity sign or azimuth sign to be given to this mobile object M that has detected this velocity sign or azimuth sign, changes the desired moving velocity and/or the desired moving direction of this mobile object M in compliance with the instruction, and writes the mobile-object data with respect to this mobile object M containing the changed desired moving velocity and/or the changed desired moving direction into the mobile-object-data store unit 104 (Step S2).

In Step S2, if the command set at the path-point RP where the mobile object M has arrived is to remove the mobile object M from the moving route RO or the space, the mobile-object data with respect to this mobile object M, namely, the identifier, the position coordinate, the desired moving velocity, the desired moving direction, the current moving velocity and the current moving direction of this mobile object M will be deleted from the mobile-object-data store unit 104.

Then, based on the mobile-object data, the simulation unit 105 increases or decreases the current moving velocity of each of the mobile objects M by a predetermined quantity so that the difference between the desired moving velocity and the current moving velocity of the mobile object M is reduced, and writes the mobile-object data with respect to each of the mobile objects M containing the consequent current moving velocity into the mobile-object-data store unit 104. In addition, the simulation unit 105 alters the current moving direction MV of each of the mobile objects M by a predetermined quantity so that the difference between the desired moving direction and the current moving direction of the mobile object M is reduced, and writes the mobile-object data with respect to each of the mobile objects M containing the consequent current moving direction MV into the mobile-object-data store unit 104 (Step S3).

Also, the simulation unit 105 obtains the current position coordinate of each of the mobile objects M existing in the space based on the mobile-object data, and obtains the position coordinate and the dimensions of each of the sign objects SO existing in the space based on the sign data. When one of the sign objects SO, the temporary stop sign or the intersection sign in particular, enters the detection range of one of the mobile objects M, the simulation unit 105 refers to the content of the instruction defined by the sign data with respect to this temporary stop sign or intersection sign to be given to this mobile object M that has detected this temporary stop sign or intersection sign, changes the current moving velocity of this mobile object M in compliance with the instruction, and writes the mobile-object data with respect to this mobile object M containing the changed current moving velocity into the mobile-object-data store unit 104 (Step S4). As described above, the intersection sign has states changing every minute over time. Hence, in the case where the mobile object M detects the intersection sign, the simulation unit 105 make a judgement on whether it is necessary or not to change the current moving velocity of this mobile object M by the current state of this intersection sign, and besides the simulation unit 105 will write the mobile-object data with respect to this mobile object M containing the changed current moving velocity into the mobile-object-data store unit 104 only if the simulation unit 105 judges that it is necessary to change the current moving velocity thereof.

Furthermore, the simulation unit 105 obtains the dimensions of each of the cubes C symbolizing each of the mobile objects M existing in the space as well as the current position coordinate of each of the mobile objects M based on the mobile-object data and the path-point data. The simulation unit 105 sets the current moving velocity of a certain mobile object M lower when the certain mobile object M approaches another mobile object M existing ahead in the moving direction MV of the certain mobile object within a prescribed range of distance than that when it does not, and writes the mobile-object data with respect to the certain mobile object M containing the consequent current moving velocity into the mobile-object-data store unit 104 (Step 5). To set the moving velocity of the mobile object M lower includes making the moving velocity of the mobile object M be 0 so as to temporarily stop the mobile object M. This means that the certain mobile object M avoids colliding with the another mobile object M. In Step 5, a collision-risk range is defined as a region that is within the predetermined angle of view Ma in the situation of looking ahead in the moving direction MV of the mobile object M from a specific point, for example, the specific vertex P2 [x, y]=[0, 0] in the cube C symbolizing the mobile object M, and within a predetermined distance from the specific point. Otherwise the collision-risk range is defined as a region that is within the predetermined angle of view Mα measured horizontally and the predetermined angle of view Mβ measured vertically in the situation of looking ahead in the moving direction MV of the mobile object M from the specific point, for example, the specific vertex P2 [x, y, 0]=[0, 0, 0] in the cube C symbolizing the mobile object M, and has a maximum horizontal distance from the specific point that is equal to or shorter than the predetermined distance. The collision-risk range is similar to the detection range within which the mobile object M detects the sign object SO. On that basis, when at least a part of the cube C symbolizing the another object M is within the collision-risk range, the simulation unit 105 judges that the certain mobile object M approaches the another mobile object M existing ahead within the prescribed range of distance.

Finally, the simulation unit 105 obtains the current position coordinate, the current moving velocity and the current moving direction MV of each of the mobile objects M based on the mobile-object data, calculates the displacement of each of the mobile objects M per unit time or the amount of change of the position coordinate of each of the mobile objects M per unit time, and updates the current position coordinate of each of the mobile objects M. After that the simulation unit 105 writes the mobile-object data with respect to each of the mobile objects M containing the updated current position coordinate into the mobile-object-data store unit 104 (Step S6).

The simulation unit 105 iteratively executes the above Steps S1 to S6 so as to simulate the movement of each of the mobile objects M in the space.

The output unit 106 generates still images or moving images showing the cubes C that symbolize the mobile objects M and the objects other than the mobile objects M existing in the space with reference to the path-point data stored by the path-point-data store unit 102, the sign data stored by the sign-data store unit 103 and the mobile-object data stored by the mobile-object-data store unit 104. The output unit 106 displays the generated still images or moving images in the screen of the display device 1i, stores data of the generated still images or moving images into a necessary memory area of the main memory 1b or the auxiliary memory device 1c, or sends it to the external devices or computers that are connected and can be communicated to the computer 1 being a nucleus of the mobile-object control system through the telecommunications lines.

The still images or moving images generated and output by the output unit 106 represent scenes where each of the real objects including the mobile objects M is symbolized by one or a plurality of the cubes C. As shown in FIG. 5, three-dimensional coordinates of eight vertices P0, P1, P2, P3, P4, P5, P6 and P7 of each of the cubes C existing in the space are already definite. Two vertices mutually adjacent in the cube C are joined by a edge of the cube C. Each of the cubes C has twelve edges L0, L1, L2, L3, L4, L5, L6, L7, L8, L9, L10 and L11 as well as the eight vertices P0, P1, P2, P3, P4, P5, P6 and P7.

First, the output unit 106 searches for one or more cubes C existing within prescribed angles of view α and β in a situation of observing the virtual space in which the many cubes C symbolizing the real objects are put along a direction of a sight line S from a point of view V. This is equivalent to choosing the cubes C to be drawn when executing a process for drawing the scene in which the real objects are symbolized by the cubes C.

The point of view V is indicated by latitude, longitude and height (it may be altitude or height above sea level). The direction of the sight line S is indicated by an azimuth angle and an elevation/depression angle of the vector S from the point of view V. The point of view V [latitude, longitude, height] and the direction of the sight line S [azimuth angle, elevation/depression angle] may be given and stored into a necessary memory area of the main memory 1b or the auxiliary memory device 1c beforehand, be input via the input device 1g, or be received from the external devices or computers that are connected and can be communicated through the telecommunications lines. Other than the above, the point of view V and the direction of the sight line S may be the point of view and the direction of the sight line of the virtual person on one of the mobile objects M moving in the space. The point of view and the direction of the sight line of the virtual person can be instructed with the commands set at the path points RP through which the mobile object M passes.

Figure 17:
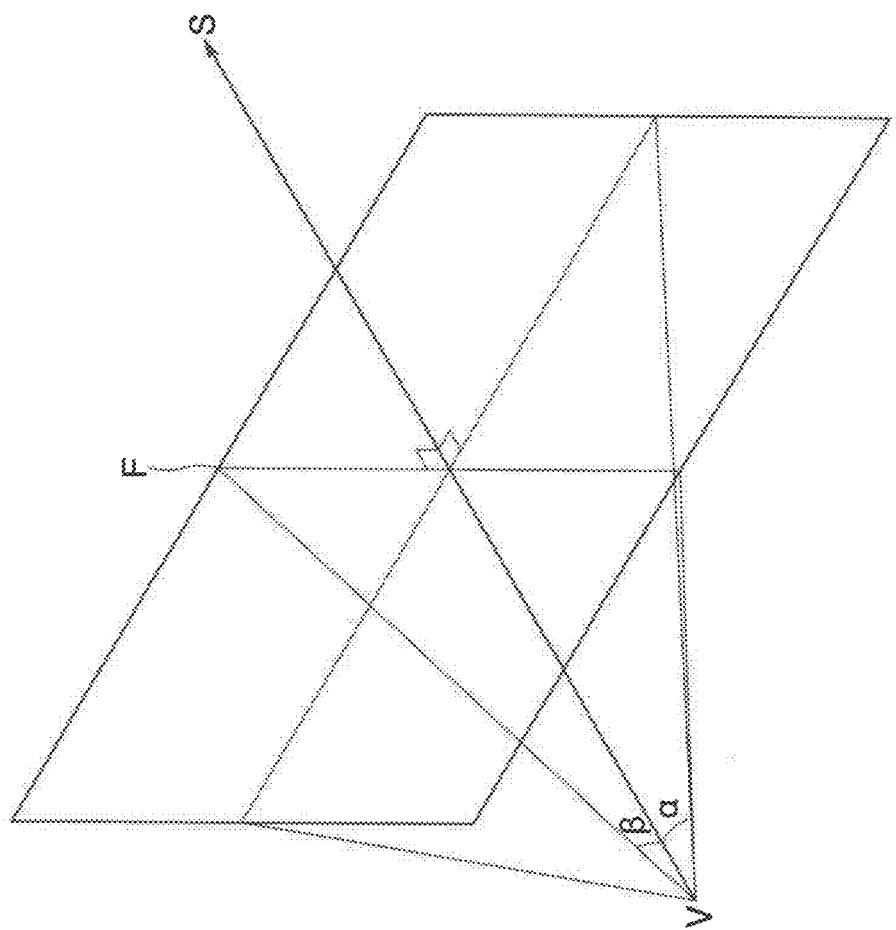
FIG. 17 is a schematic diagram in a perspective view showing a relationship between a point of view, a direction of a sight line, a screen and an angle of view according to the embodiment.
Figure 18:
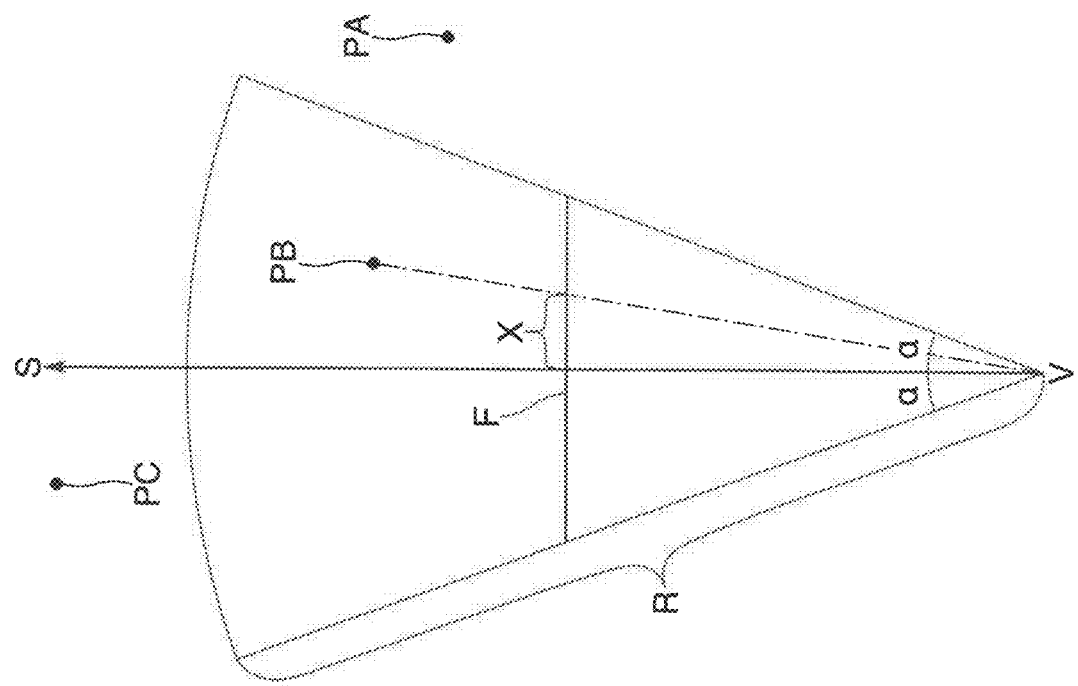
FIG. 18 is a schematic diagram in a plan view showing the relationship between the point of view, the direction of the sight line, the screen and the angle of view according to the embodiment.
Figure 19:
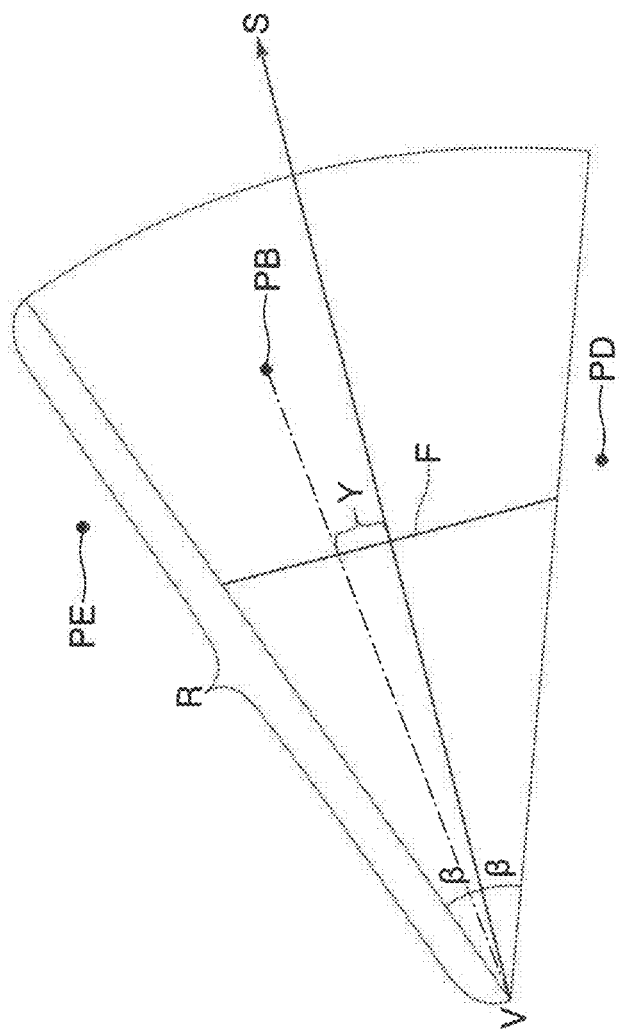
FIG. 19 is a schematic diagram in a side view showing the relationship between the point of view, the direction of the sight line, the screen and the angle of view according to the embodiment.

As shown in FIGS. 17 to 19, the output unit 106 extracts information on one or a plurality of the cubes C that can be projected onto a screen F orthogonal to the sight line S having a finite area in the situation of observing in the direction of the sight line S from the point of view V. Dimensions of the screen F, in other words, the angles of view α and β are set to an extent of, for instance, 10° left and 10° right from the sight line S, 10° up and 10° down from the sight line S (that is, $2\alpha=2\beta=40°$). The angles of view α and β are arbitrary, those may not be predetermined and may be given similarly to the point of view V and the direction of the sight line S.

While the output unit 106 is searching for the cubes C, of course it is possible to target even the cubes C infinitely distant from the point of view V, however, it is preferable to set a range of distance R from the point of view V that should be searched to a finite value. For example, only the cubes C existing within a range of 10 km or 100 km from the point of view V are treated as targets of the search, the cubes C farther than that are excluded from the search. The reason is that (the objects symbolized by) the cubes C far away from the point of view V are practically invisible or do not have to be seen, and therefore those cubes C do not have to be drawn. The range of distance R from the point of view V to be searched may be always constant, it may not be predetermined and may be given similarly to the point of view V and the direction of the sight line S.

The output unit 106 reads the information on the position coordinates and the dimensions of the cubes C existing in the space, and chooses the following ones from among the cubes C existing in the space based on those:

(I) The cube C having the position coordinate [latitude, longitude] of one of the southwest corner, the south east corner, the northeast corner and the northwest corner (or the center and so on) within the prescribed angle of view α in the situation of observing in the direction of the given sight line S [azimuth angle] from the given point of view V [latitude, longitude], (II) And besides having the position coordinate [latitude, longitude] of one of the southwest corner, the south east corner, the northeast corner and the northwest corner (or the center and so on), the horizontal distance between this position coordinate and the given point of view V [latitude, longitude] being within the prescribed range of distance R. In conformity with the example shown in FIG. 18, since a vertex PA of a certain cube C is located out of the angle of view α expanding in the left and right direction, this cube C having the vertex PA does not meet the condition (I). On the other hand, vertices PB and PC of another cubes C are located within the angle of view α expanding in the left and right direction. However, since the vertex PC is out of the prescribed range of distance R from the point of view V, that is, the vertex PC is too far from the point of view V, the cube C having the vertex PC does not meet the condition (II). Consequently the cube C having the vertex PB meets the conditions (I) and (II).

Further, the output unit 106 chooses the following ones from among the cubes C meeting the above conditions (I) and (II):

(III) The cube C having the position coordinate [latitude, longitude, height] of one of the corners (or the center and so on) of the upper surface above the lower limit of the prescribed angle of view β, and besides having the position coordinate [latitude, longitude, height] of one of the corners (or the center and so on) of the lower surface below the upper limit of the prescribed angle of view β in the situation of observing in the direction of the given sight line S [elevation/depression angle] from the given point of view V [latitude, longitude, height].

In conformity with the example shown in FIG. 19, since a vertex PD of an upper surface of a certain cube C is located below the lower limit of the angle of view β expanding in the up and down direction, this cube C having the vertex PD does not meet the condition (III). Also, since a vertex PE of a lower surface of another cube C is located above the upper limit of the angle of view β expanding in the up and down direction, this cube C having the vertex PE does not meet the condition (III). By contrast, since the vertex PB of the cube C is within the angle of view β expanding in the up and down direction, this cube C having the vertex PB meets the condition (III).

The cubes C meeting all of the above conditions (I), (II) and (III) become ones to be drawn. The output unit 106 chooses such one or ones and read the information needed to draw those cubes C, namely, the position coordinates, the dimensions, the colors and so on of those cubes C.

Next, with respect to each of the cubes C chosen to be drawn, the output unit 106 calculates position coordinates [X coordinate in the horizontal direction, Y coordinate in the vertical direction] of the vertices P0, P1, P2, P3, P4, P5, P6 and P7 of the cube C in the screen F where the cube C is projected onto the screen F.

In conformity with the example shown in FIG. 18, the coordinate in the horizontal direction in the screen F of the vertex PB of the cube C to be drawn that is projected onto the screen F is given by an angle X formed by a line segment extending in the direction of the sight line S from the point of view V and a line segment extending toward the vertex PB from the point of view V in a situation of observing along a direction parallel to the vertical direction and orthogonal to the sight line S (i.e. in a plan view). This angle X is a difference between an azimuth of the sight line S from the point of view V and an azimuth of the vertex PB from the same point of view V.

In conformity with the example shown in FIG. 19, the coordinate in the vertical direction in the screen F of the vertex PB of the cube C to be drawn that is projected onto the screen F is given by an angle Y formed by a line segment extending in the direction of the sight line S from the point of view V and a line segment extending toward the vertex PB from the point of view V in a situation of observing along a direction parallel to the horizontal direction and orthogonal to the sight line S (i.e. in a side view). This angle X is a difference between an elevation/depression angle of the sight line S from the point of view V and an elevation/depression angle of the vertex PB from the same point of view V. The output unit 106 calculates the position coordinate [X, Y] in the screen F of each of the vertices P0, P1, P2, P3, P4, P5, P6 and P7 of the cubes C to be drawn.

Moreover, with respect to each of the cubes C to be drawn, the output unit 106 decides which vertices P0, P1, P2, P3, P4, P5, P6 and P7 of the cube C are hidden by the cube C itself and cannot be seen from the point of view V, in other words, which vertices P0, P1, P2, P3, P4, P5, P6 and P7 do not have to be drawn. In detail, the output unit 106 calculates slope distance (which is actual or literal distance including difference in height) from the point of view V [latitude, longitude, height] to the positions [latitude, longitude, height] of the vertices P0, P1, P2, P3, P4, P5, P6 and P7 each, and judges one with the longest slope distance from the point of view V as the invisible vertex hidden by the cube C itself.

Further, the output unit 106 calculates distance between the position coordinate [X, Y] in the screen F of the vertex with the longest slope distance from the point of view V and the position coordinate [X, Y] in the screen F of another vertex with the second longest slope distance from the point of view V. When the distance between both in the screen F is shorter than a threshold, the output unit 106 judges the another vertex with the second longest slope distance from the point of view V as the invisible vertex hidden by the cube C itself too. The threshold is set such that an angle formed by a line segment from the point of view V to the former farthest vertex and a line segment from the point of view V to the latter second farthest vertex is about 0.5°.

In addition, the output unit 106 calculates distance between the position coordinate [X, Y] in the screen F of the vertex with the longest slope distance from the point of view V and the position coordinate [X, Y] in the screen F of another vertex with the third longest slope distance from the point of view V. When the distance between both in the screen F is shorter than a threshold, the output unit 106 judges the vertex with the third longest slope distance from the point of view V and the vertex with the fourth longest slope distance from the point of view V as the invisible vertices hidden by the cube C itself too. The threshold is set such that an angle formed by the line segment from the point of view V to the former farthest vertex and a line segment from the point of view V to the latter third farthest vertex is about 0.5°.

The edges connecting with the invisible vertex hidden by the cube C itself among the twelve edges L0, L1, L2, L3, L4, L5, L6, L7, L8, L9, L10 and L11 the cube C to be drawn has are also hidden by the cube C itself and cannot be seen. Such edges do not have to be drawn.

Furthermore, with respect to each of the cubes C to be drawn, the output unit 106 decides which edges L0, L1, L2, L3, L4, L5, L6, L7, L8, L9, L10 and L11 do not have to be drawn because those are far away from the point of view V and therefore look too short when seen from the point of view V. In detail, the output unit 106 calculates distance between the position coordinate [X, Y] in the screen F of one of the two vertices joined by the edge and the position coordinate [X, Y] in the screen F of the other vertex. When the distance between both in the screen F is shorter than a threshold, the output unit 106 judges the edge joining those two vertices as the edge that does not have to be drawn. The threshold is set such that an angle formed by a line segment from the point of view V to one of the two vertices and a line segment from the point of view V to the other vertex is about 0.5°.

On top of that, with respect to each of the cubes C to be drawn, the output unit 106 decides which vertices P0, P1, P2, P3, P4, P5, P6 and P7 do not have to be drawn because those are far away from the point of view V and therefore are almost indistinguishable from each other when seen from the point of view V. In detail, the output unit 106 calculates distance between the position coordinate [X, Y] in the screen F of one of the vertices and the position coordinate [X, Y] in the screen F of another vertex neighboring on the aforementioned vertex. When the distance between both in the screen F is shorter than a threshold, the output unit 106 judges either of the two vertices as the vertex that does not have to be drawn. The threshold is set such that an angle formed by a line segment from the point of view V to one of the two vertices and a line segment from the point of view V to the other vertex is about 0.05°. This threshold is smaller than the above other thresholds.

All of the vertices P0, P1, P2, P3, P4, P5, P6 and P7 and all of the edges L0, L1, L2, L3, L4, L5, L6, L7, L8, L9, L10 and L11 of each of the cubes C to be drawn are not always within an area of the screen F, in other words, within the angles of view α and β. The output unit 106 judges the vertex with the position coordinate [X, Y] in the screen F that is outside of the screen F as the vertex that does not have to be drawn. The output unit 106 also judges the edge joining the two vertices that are outside of the screen F as the edge that does not have to be drawn.

Information on the position coordinates [X, Y] in the screen F of the vertices P0, P1, P2, P3, P4, P5, P6 and P7 of each of the cubes C to be drawn and others calculated and obtained in such a way as described above is used to draw three-dimensional graphics of a scene where one or more cubes C are observed in the direction of the sight line S from the point of view V. As shown in FIG. 20, the information contains, with respect to each of the cubes C chosen to be drawn, the position coordinates [X, Y] in the screen F of the eight vertices P0, P1, P2, P3, P4, P5, P6 and P7 of the cube C, the decision on whether each of the vertices P0, P1, P2, P3, P4, P5, P6 and P7 has to be drawn or not, the decision on whether each of the twelve edges L0, L1, L2, L3, L4, L5, L6, L7, L8, L9, L10 and L11 joining the two vertices mutually adjacent has to be drawn or not, the colors of the cube C, and so on. The output unit 106 writes this information into the main memory 1*b* or the auxiliary memory device 1*c*. It is possible to send this information to the external devices or computers that are connected and can be communicated through the telecommunications lines.

The output unit 106 carries out the drawing of the three-dimensional graphics based on this information. The output unit 106 draws one or more cubes C seen from the point of view V and displays those in the screen of the display device 1*i*. This information indicates the vertices and the edges that do not have to be drawn among the vertices P0, P1, P2, P3, P4, P5, P6 and P7 and the edges L0, L1, L2, L3, L4, L5, L6, L7, L8, L9, L10 and L11 of one cube C, a three-dimensional-graphics-drawing program can perform hidden lines removal. In contrast, when a plurality of the cubes C overlap with each other, that is, all or part of one cube C far from the point of view V is hidden by another cube C nearer to the point of view V and cannot be seen, it is necessary for the drawing program itself to detect and deal with the hidden part or cube C.

The current position coordinate and the moving direction MV of each of the mobile objects M stored by the mobile-object-data store unit 104 are changed every minute in the simulation executed by the simulation unit 105. In other words, the position of each of the cubes C symbolizing the mobile objects M and the direction to which each of the cubes C faces in the space are changed every unit time. Gathering the images in which the positions of the cubes C are drawn generated per unit time by the output unit 106 makes it possible to obtain the moving image in which the cubes C move along the moving routes RO in the space.

There are several concrete settings of the point of view V and the direction of the sight line S, the specific examples are listed below:

"Map" It means a top view camera to represent a scene like a map in which the cubes C symbolizing the mobile objects M and the objects other than the mobile objects M are observed from directly above. The user can alter the azimuth angle of the direction of the sight line S within a certain range through the input device 1*g*. The point of view V is provided so that the vector of the sight line S points at a position or the mobile object M selected by the user through the input device 1*g*.

"Overview" It means a camera to represent a scene like a birds-eye view in which the cubes C symbolizing the mobile objects M and the objects other than the mobile objects M are observed from above, with a perspective as though the observer were a bird. For example, the camera tracks the mobile object M 40 m ahead while the point of view V is set 20 m above and besides the elevation/depression angle of the sight line S is set to −30° (depression angle). There are two tracking modes, one is such that the direction of the sight line S is fixed and the point of view V is displaced horizontally so that the vector of the sight line S points at the mobile object M selected by the user through the input device 1*g*, the other is such that the point of view V is fixed and the direction of the sight line S is tilted so that the vector of the sight line S points at the mobile object M selected by the user through the input device 1*g*. In the latter tracking mode, when an angle formed by the sight line S and a perpendicular line exceeds a predetermined value, for instance, ±10°, the point of view V is changed so that the angle formed by the sight line S and the perpendicular line is decreased or 0°.

"Follow" It means a camera to represent the cubes C symbolizing the mobile objects M and the objects other than the mobile objects seen while the camera follows behind one of the mobile objects M moving in the space along the moving direction MV, the camera being apart from the target mobile object M by a predetermined distance. For example, the camera keeps the target mobile object M selected by the user through the input device 1*g* in the angle of view α while the point of view V is set 5 m behind the target mobile object M and 2 m above the target mobile object M, and besides the elevation/depression angle of the sight line S is set to −10° (depression angle).

"Mobile eye" It means a camera to represent the cubes C symbolizing the mobile objects M and the objects other than the mobile objects seen in the direction of the sight line of the virtual person on one of the mobile objects M moving in the space from the point of view of the virtual person. That is, the direction of the sight line and the point of view of the virtual person on the mobile object M selected by the user through the input device 1*g* are provided as the direction of the sight line S and the point of view V each.

The output unit 106 can draw the sign objects SO (i.e. generate images including representation of the sign objects SO) similarly to drawing the cubes C symbolizing the objects, and can skip drawing the sign objects SO (i.e. generate images excluding representation of the sign objects SO).

According to this embodiment, the mobile-object control system is configured such that the system includes the path-point-data store unit 102 to store the path-point data containing the coordinates of each of a plurality of path points RP on the route RO along which the mobile object M moves in the space; the sign-data store unit 103 to store the sign data containing the coordinates of the sign object SO that influences the moving velocity or the moving direction MV of the mobile object M moving in the space and the content of the instruction regarding the moving velocity or the moving direction MV that the sign object SO gives to the mobile object M which catches this sign object SO within the prescribed range (the detection range) from the mobile object M; the mobile-object-data store unit 104 to store the mobile-object data containing the current coordinates, the current moving velocity and the current moving direction MV of each of a plurality of the mobile objects M moving in the space; and the simulation unit 105 to iteratively calculate the coordinates, the moving velocity and the moving direction MV of each of the mobile objects M moving in the space in every unit time with reference to the path-point data stored by the path-point-data store unit 102, the sign data stored by the sign-data store unit 103 and the mobile-object data stored by the mobile-object-data store unit 104, and to write the calculated new coordinates, the calculated new moving velocity and the calculated new moving direction MV of each of the mobile objects M into the mobile-object-data store unit 104.

This embodiment can supports making a traffic planning for an environment in which a plurality of the mobile objects M move along the moving routes RO, in particular, so as to avoid collision of the mobile objects M with each other and relieve traffic congestion. The calculation amount required to simulate is comparatively small, calculation time can be shorten, consumption of memory area of the main memory 1b or the auxiliary memory device 1c is prevented from increasing.

The mobile-object control system in this embodiment includes the output unit 106 to generate the image showing the current position of at least one of the mobile objects M in the space with reference to the mobile-object data stored by the mobile-object-data store unit 104, thereby it is possible to visualize and display the result of the simulation.

The mobile-object control system in this embodiment includes the cube-data store unit 101 to store the cube data containing the coordinates, the flat dimensions and the height of each of a plurality of the cubes C that symbolize the object existing in the space other than the mobile object M. On top of that, the output unit 106 generates the image showing the cubes C that symbolize the object existing in the space as well as the current position of at least one of the mobile objects M in the same space, and display the image in the screen of the monitor 1i.

The mobile-object control system is configured such that the sign-data store unit 103 stores the sign data containing the content of the current instruction changed over time regarding the moving velocity or the moving direction MV that the sign object SO (the intersection sign) gives to the mobile object M which catches the sign object SO within the prescribed range from the mobile object M, and besides the simulation unit 105 iteratively calculates the coordinates, the moving velocity and the moving direction MV of each of the mobile objects M moving in the space in every unit time based on the content of the current instruction that the sign object SO gives to the mobile object M stored by the sign-data store unit 103, and writes the calculated new coordinates, the calculated new moving velocity and the calculated new moving direction MV of each of the mobile objects M into the mobile-object-data store unit 104. Hence, it is possible to simulate control of the movement of each of the mobile objects M with the sine object SO that is set in the space and has states changing over every minute like a signal.

The mobile-object control system is configured such that the simulation unit 105 sets, based on the current coordinates and the current moving direction MV of each of the mobile objects M stored by the mobile-object-data store unit 104, the moving velocity of a certain mobile object M lower when the certain mobile object M approaches another mobile object M existing ahead in the direction of movement MV of the certain mobile object M within the prescribed range of distance (the collision-risk range) than that when it does not, and writes the new coordinates, the new moving velocity and the new moving direction MV of the certain mobile object M into the mobile-object-data store unit 104. Hence, it is possible to simulate the movement of the mobile objects M in traffic congestion.

The present invention is not limited to the above-described embodiment. The intersection sign, which is one of the sign objects SO in the embodiment, has several states changing over every minute, and switches which of the mobile objects M (or which of the moving routes RO) this intersection sign restrains from moving based on the states. The intersection sign is the sign object SO that gives the instruction changed over time regarding the moving velocity to the mobile object M. Other than that, for example, it is possible to provide the azimuth sign having several states changing over every minute, in other words, the sign object SO that gives the instruction changed over time regarding the moving direction MV to the mobile object M which catches this azimuth sign being the sign object SO within the prescribed range (the detection range) from the mobile object M. In this case, the content of the instruction to be given to the mobile object M that the sign data with respect to the azimuth sign contains is expressed as, for example, [90, 30, 0, 0, 30, 0]. Those exemplificative values mean that, first the azimuth sign should be in a state of instructing the mobile object M to turn the moving direction MV to an azimuth angle of 90° for 30 seconds, next the azimuth sign should be in a state of instructing the mobile object M to turn the moving direction MV to an azimuth angle of 0° for 30 seconds and subsequently transit to the former state so as to iterate those two states, and besides intervals between those two states are set to 0. In addition, it is possible to provide the sign object SO that gives the instruction changed over time regarding each of the moving velocity and the moving direction MV to the mobile object M which catches this sign object SO within the prescribed range from the mobile objects M (or the sign object SO that influences both the moving velocity and the moving direction MV).

Regarding to the concrete configurations of the respective components and procedures of the process, various modifications are possible without departing from the scope and spirit of the present invention.

DESCRIPTION OF THE REFERENCE SIGNS

1: Computer
101: Cube-data store unit
102: path-point-data store unit
103: sign-data store unit
104: Mobile-object-data store unit
105: Simulation unit
106: Output unit

The invention claimed is:

1. A non-transitory computer-readable storage medium encoded with a program, the program including instructions for a mobile-object control system and making a computer function as:
   a path-point-data store unit to store path-point data containing coordinates of each of a plurality of path points on a route along which a mobile object moves in a space;
   a sign-data store unit to store sign data containing coordinates of a sign object that influences a moving velocity or a moving direction of the mobile object moving in the space and content of an instruction regarding the moving velocity or the moving direction that the sign object gives to the mobile object which catches the sign object within a prescribed range from the mobile object;
   a mobile-object-data store unit to store mobile-object data containing current coordinates, a current moving velocity, and a current moving direction of each of a plurality of the mobile objects moving in the space; and
   a simulation unit to iteratively calculate the coordinates, the moving velocity and the moving direction of each of the mobile objects moving in the space in every unit time with reference to the path-point data stored by the path-point-data store unit, the sign data stored by the sign-data store unit, and the mobile-object data stored by the mobile-object-data store unit, and to write the calculated new coordinates, the calculated new moving velocity and the calculated new moving direction of each of the mobile objects into the mobile-object-data store unit,
   wherein the sign-data store unit stores the sign data containing, the content of the current instruction changed over time regarding the moving velocity or the moving direction that the sign object gives to the mobile object which catches the sign object within the prescribed range from the mobile object,
   wherein the simulation unit iteratively calculates the coordinates, the moving velocity, and the moving direction of each of the mobile objects moving in the space in ever unit time based on the content of the current instruction that the sign object gives to the mobile object stored by the sign-data store unit, and writes the calculated new coordinates, the calculated new moving velocity, and the calculated new moving direction of each of the mobile objects into the mobile-object-data store unit,
   wherein the sign object includes an intersection sign object formed into a square shape and eight triangular portions, each of which is configured to become a portion symbolizing green lights and a portion symbolizing red lights,
   wherein the intersection sign object has several states changing over every minute,
   wherein when the portion symbolizing green lights of the intersection sign is closer than the portion symbolizing red lights thereof from a cube symbolizing the mobile object and further overlaps with a detection range from a specific point of a same cube a movement of the mobile object is permitted by the intersection sign, and
   wherein, when the portion symbolizing red lights of the intersection sign is closer than the portion symbolizing green lights thereof from the cube symbolizing the mobile object and further overlaps with the detection range from the specific point of the same cube the movement of the mobile object is prohibited by the intersection sign.

2. The non-transitory computer-readable storage medium according to claim 1, wherein the sign-data store unit stores the sign data containing the content of the current instruction changed over time regarding the moving velocity.

3. The non-transitory computer-readable storage medium according to claim 1, wherein the sign-data store unit stores the sign data containing the content of the current instruction changed over time regarding the moving direction.

4. The non-transitory computer-readable storage medium according to claim 1, wherein the intersection sign provides the instruction changed over time regarding the moving velocity to the mobile object.

5. The non-transitory computer-readable storage medium according to claim 1, wherein each of the eight triangular portions of the intersection sign object corresponds to one of the states.

6. The non-transitory computer-readable storage medium according to claim 1, wherein the detection range is defined as a region that is within a predetermined angle of view in a situation of looking ahead in the moving direction of the mobile object from the specific point.

7. The non-transitory computer-readable storage medium according to claim 1, wherein, when at least a part of the sign object is within the detection range, the mobile object detects the sign object.

8. The non-transitory computer-readable storage medium according to claim 1, wherein the sign object includes three-dimensional solids formed into a rectangular parallelepiped similarly to the cube symbolizing the mobile object.

9. A mobile-object control system, comprising:
   a path-point-data store unit to store path-point data containing coordinates of each of a plurality of path points on a route along which a mobile object moves in a space;
   a sign-data store unit to store sign data containing coordinates of a sign object that influences a moving velocity or a moving direction of the mobile object moving in the space and a content of an instruction regarding the moving velocity or the moving direction that the sign object gives to the mobile object which catches the sign object within a prescribed range from the mobile object;
   a mobile-object-data store unit to store mobile-object data containing current coordinates, a current moving velocity, and a current moving direction of each of a plurality of the mobile objects moving in the space; and
   a simulation unit to iteratively calculate the coordinates, the moving velocity, and the moving direction of each of the mobile objects moving in the space in every unit time with reference to the path-point data stored by the path-point-data store unit, the sign data stored by the sign-data store unit, and the mobile-object data stored by the mobile-object-data store unit, and to write the calculated new coordinates, the calculated new moving velocity, and the calculated new moving direction of each of the mobile objects into the mobile-object-data store unit,
   wherein the sign-data store unit stores the sign data containing the content of the current instruction changed over time regarding the moving velocity or moving direction that the sign object gives to the mobile object which catches the sign object within the prescribed range from the mobile object, wherein the simulation unit iteratively calculates the coordinates, the moving velocity, and the moving direction of each of the mobile objects moving in the space in every unit time based on the content of the current instruction that the sign object gives to the mobile object stored by the sign-data store unit, and writes the calculated new coordinates the calculated new moving velocity, and the calculated new moving direction of each of the mobile objects into the mobile-object-data store unit, wherein the sign object includes an intersection sign object formed into a square shape and eight triangular portions, each of which is configured to become a portion symbolizing green lights and a portion symbolizing red lights, wherein the intersection sign object has several states changing over every minute, wherein, when the portion symbolizing green lights of the intersection sign is closer than the portion symbolizing red lights thereof from a cube symbolizing the mobile object and further overlaps with a detection range from a specific point of a same cube, a movement gf the mobile object is permitted by the intersection sign, and wherein, when the portion symbolizing red lights of the intersection sign is closer than the portion symbolizing green lights thereof from the cube symbolizing the mobile object and further overlaps with the detection range from the specific point of the same cube, the movement of the mobile object is prohibited by the intersection sign.

10. The mobile-object control system according to claim 9, further comprising an output unit to generate an image showing a current position of at least one of the mobile objects in the space with reference to the mobile-object data stored by the mobile-object-data store unit.

11. The mobile-object control system according to claim 10, further comprising a cube-data store unit to store cube data containing coordinates, flat dimensions, and a height of each of a plurality of cubes that symbolize an object existing in the space other than the mobile object, wherein the output unit generates an image showing the cubes that symbolize the object existing in the space as well as the current position of at least one of the mobile objects in a same space, and displays the image in a screen of a monitor.

12. The mobile-object control system according to claim 9, wherein the simulation unit sets, based on the current coordinates and the current moving direction of each of the mobile objects stored by the mobile-object-data store unit, the moving velocity of a certain mobile object lower when the certain mobile object approaches another mobile object existing ahead in a direction of movement of the certain mobile object within a prescribed range of distance than that when it does not, and writes the new coordinates, the new moving velocity, and the new moving direction of the certain mobile object into the mobile-object-data store unit.

13. The mobile-object control system according to claim 9, wherein the sign-data store unit stores the sign data containing the content of the current instruction changed over time regarding the moving velocity.

14. The mobile-object control system according to claim 9, wherein the sign-data store unit stores the sign data containing the content of the current instruction changed over time regarding the moving direction.

15. The mobile-object control system according to claim 9, wherein the intersection sign provides the instruction changed over time regarding the moving velocity to the mobile object.

16. The mobile-object control system according to claim 9, wherein each of the eight triangular portions of the intersection sign object corresponds to one of the states.

17. The mobile-object control system according to claim 9, wherein the detection range is defined as a region that is within a predetermined angle of view in a situation of looking ahead in the moving direction of the mobile object from the specific point.

18. The mobile-object control system according to claim 9, wherein, when at least a part of the sign object is within the detection range, the mobile object detects the sign object.

19. The mobile-object control system according to claim 9, wherein the sign object includes three-dimensional solids formed into a rectangular parallelepiped similarly to the cube symbolizing the mobile object.

* * * * *